US009385351B2

(12) United States Patent
Workman et al.

(10) Patent No.: US 9,385,351 B2
(45) Date of Patent: Jul. 5, 2016

(54) MODULAR AND PORTABLE BATTERY PACK POWER SYSTEM

(71) Applicant: Goal Zero LLC, Bluffdale, UT (US)

(72) Inventors: Robert E. Workman, Morgan, UT (US); Norman Krantz, Draper, UT (US); Joseph R. Atkin, Highland, UT (US); Walker Ford, Bluffdale, UT (US)

(73) Assignee: GOAL ZERO LLC, Bluffdale, UT (US)

( * ) Notice: Subject to any disclaimer, the term of this patent is extended or adjusted under 35 U.S.C. 154(b) by 610 days.

(21) Appl. No.: 13/719,089

(22) Filed: Dec. 18, 2012

(65) Prior Publication Data
US 2013/0183562 A1   Jul. 18, 2013

Related U.S. Application Data

(60) Provisional application No. 61/584,011, filed on Jan. 6, 2012.

(51) Int. Cl.
H01M 2/10 (2006.01)
H01M 2/20 (2006.01)

(52) U.S. Cl.
CPC ............ H01M 2/1022 (2013.01); H01M 2/204 (2013.01)

(58) Field of Classification Search
USPC ........................................ 429/100
See application file for complete search history.

(56) References Cited

U.S. PATENT DOCUMENTS

| D599,286 S | 9/2009 | Horito et al. |
|---|---|---|
| D600,000 S | 9/2009 | Horito et al. |
| D625,251 S | 10/2010 | Workman et al. |
| D629,746 S | 12/2010 | Workman et al. |
| 8,080,972 B2 | 12/2011 | Smith |
| D651,564 S | 1/2012 | Workman et al. |
| D664,499 S | 7/2012 | Workman et al. |
| D670,244 S | 11/2012 | Workman et al. |
| 2009/0296442 A1* | 12/2009 | Chang et al. .......... 363/142 |
| 2009/0305117 A1* | 12/2009 | Koh .......... H01M 10/425 49/61 |
| 2010/0117591 A1* | 5/2010 | Thomas et al. .......... 320/101 |

(Continued)

FOREIGN PATENT DOCUMENTS

WO    2011025933    9/2011

OTHER PUBLICATIONS

U.S. Appl. No. 12/945,583, filed Nov. 12, 2010, Workman et al.

(Continued)

Primary Examiner — Ula C Ruddock
Assistant Examiner — Osei Amponsah
(74) Attorney, Agent, or Firm — Foley & Lardner LLP

(57) ABSTRACT

A reconfigurable battery pack power system with interchangeable accessories has at least one modular, portable, rechargeable battery module having a first side, the first side having a first contour and a mounting port and a power output port, and at least one accessory module configured to receive power from the battery module. The accessory module has a second side with a second contour that mates with the first contour on the battery module, and has a power coupling connector and a fastener. The accessory module is interchangeably mateable with the battery module with the first and second contours nested together, and with the power output port engaged with the power coupling connector and with the fastener engaged with the mounting port, so that the battery module and the accessory module form a single integrated and substantially rigid structure.

5 Claims, 37 Drawing Sheets

(56) References Cited

U.S. PATENT DOCUMENTS

| | | | |
|---|---|---|---|
| 2010/0275564 A1* | 11/2010 | Baetica | A01D 34/78 56/11.9 |
| 2011/0116254 A1 | 5/2011 | Workman et al. | |
| 2011/0162690 A1 | 7/2011 | Workman et al. | |
| 2011/0290307 A1 | 12/2011 | Workman et al. | |
| 2012/0281392 A1 | 11/2012 | Workman et al. | |

OTHER PUBLICATIONS

U.S. Appl. No. 13/579,266, filed Aug. 15, 2012, Workman et al.
U.S. Appl. No. 29/387,865, filed Mar. 18, 2011, Workman et al.
U.S. Appl. No. 29/410,374, filed Jan. 6, 2012, Workman et al.
U.S. Appl. No. 29/410,376, filed Jan. 6, 2012, Workman et al.
U.S. Appl. No. 29/410,386, filed Jan. 6, 2012, Workman et al.

* cited by examiner

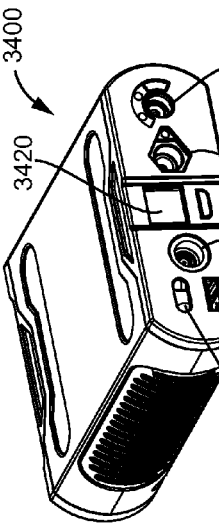
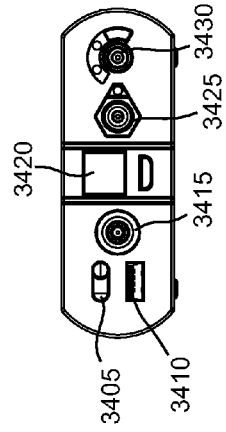
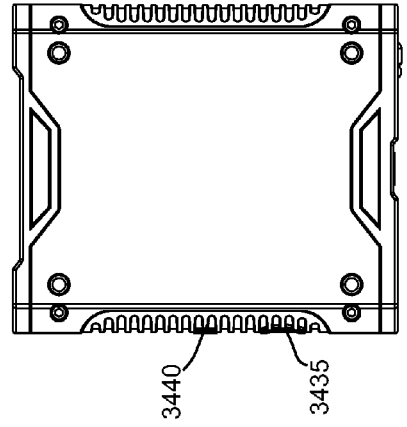
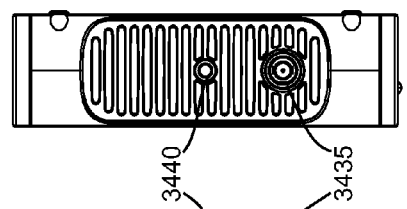
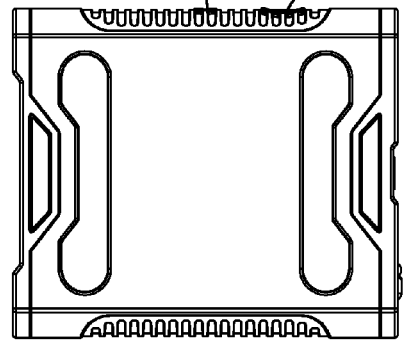
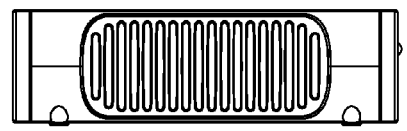
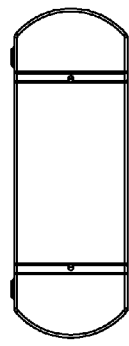

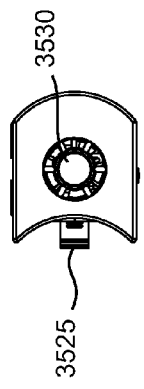
FIGURE 35H
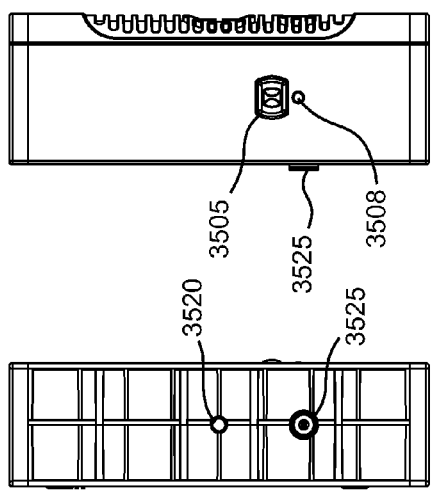
FIGURE 35C
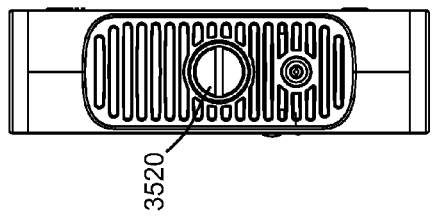
FIGURE 34F
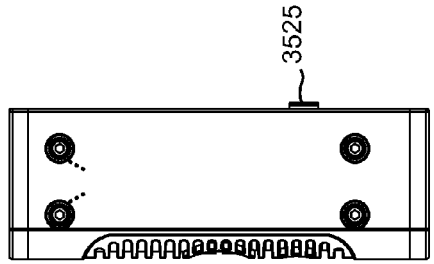
FIGURE 35G
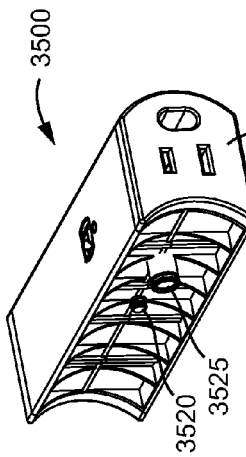
FIGURE 35E
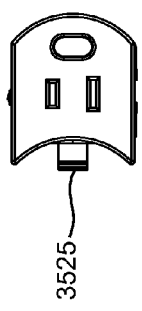
FIGURE 35B
FIGURE 35D

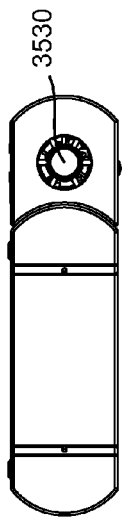
FIGURE 36H
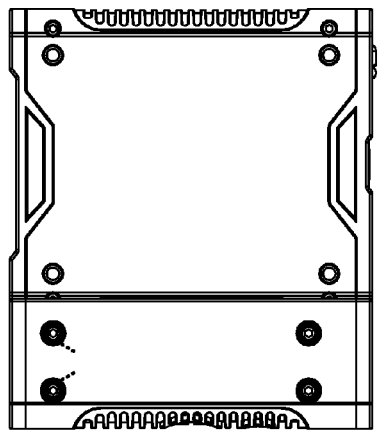
FIGURE 36D
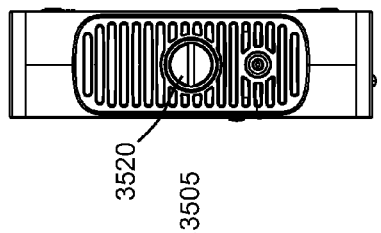
FIGURE 36E
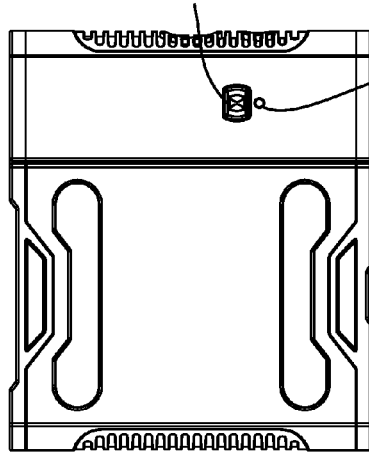
FIGURE 36F
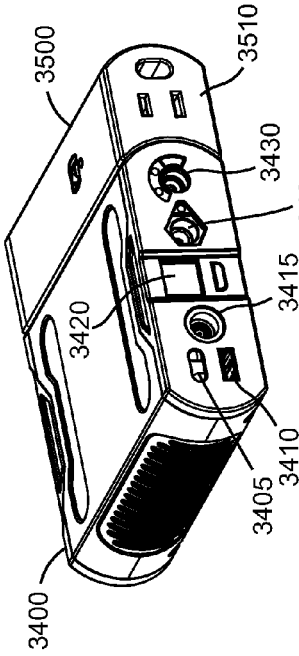
FIGURE 36C
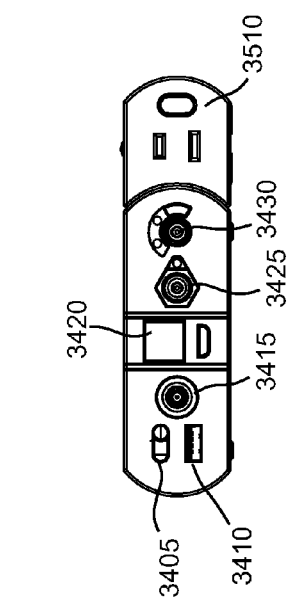
FIGURE 36B
FIGURE 36G

MODULAR AND PORTABLE BATTERY PACK POWER SYSTEM

CROSS-REFERENCE TO RELATED APPLICATIONS

The present Application claims the benefit of priority under 35 U.S.C. §119(e)(1) of U.S. Provisional Patent Application No. 61/584,011, titled "Modular and Portable Battery Pack Power System" and filed on Jan. 6, 2012, the complete disclosure of which is incorporated herein by reference.

FIELD

The present disclosure relates to a battery pack power system for providing power to a wide variety of electrical loads. The present disclosure relates more particularly to a modular and portable battery pack power system having individual battery modules of various capacities that are modular, portable, stackable, electrically chainable, reconfigurable, and rechargeable. The present disclosure relates more particularly to a modular and portable battery pack power system having individual battery modules that are nestable and/or connectable to one another to permit individual modules to be custom connected to one another in a building-block type manner and to be electrically chainable to one another in a plug-and-play type manner.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Rechargeable battery packs for providing power to electrical devices and accessories are generally known. However, many types of rechargeable battery packs come in fixed sizes that are not readily reconfigurable for use in a wide variety of applications. Typically, when a relatively high capacity is required, the corresponding battery pack tends to be prohibitively large and heavy and is not conveniently portable to suit the desired mobility of a user. Certain types of battery power packs are made up from multiple cells, but such cells are usually connected to one another by relatively permanent and inflexible connections, such as bus bars, cable and clamp connectors, and the like, that do not provide a desired degree of modularity and portability. Further, such known battery pack systems typically include electrical connections that are at least partially exposed, which may present shock and/or short circuit hazards.

Accordingly, It would be desirable to provide an improved battery pack power system that overcomes the disadvantages of the known battery pack power systems.

It would be desirable to provide an improved battery pack power system that is (among others) modular, portable, stackable, electrically chainable, reconfigurable, and rechargeable.

It would also be desirable to provide an improved battery pack system having individual modules that are capable of being transported separately (e.g. carried by different members of a group, etc.) to remote off-grid locations or outposts to provide power to electrical devices, and to be recharged by renewable sources, such as a compact, portable solar PV panel, or a portable wind power generator, or a portable hydropower generator.

It would also be desirable to provide an improved battery pack power system having individual battery modules of various capacities that can be mixed and matched (or otherwise reconfigured) with one another to suit any of a wide variety of applications or to provide the desired power to any of a wide variety of loads (i.e. electrical devices, appliances, tools, portable medical devices, etc.).

It would also be desirable to provide an improved battery pack power system having individual battery modules that are stackable or otherwise nestable or connectable with one another (e.g. in a 'building block' manner or the like) to create an assembly.

It would also be desirable to provide an improved battery pack power system that is ventilated in a manner that airflow is not obstructed when the modules are connected to one another.

It would also be desirable to provide an improved battery pack power system that has flexible electrical connectors for "chaining" or otherwise electrically connecting the individual battery modules to one another in a quick-connect manner (e.g. a 'plug-and-play' manner or the like) that permits only one-way, correct-orientation connection of modules to one another, and that features no exposed electrically conductive surfaces so that shock hazards to users are minimized and so that possibility of potential damage to the modules from short circuit contacts with external objects is minimized.

It would also be desirable to provide an improved battery pack power system that has individual battery modules with a charge indicator or meter that readily identifies the real-time remaining charge state of the battery module.

It would also be desirable to provide an improved battery pack power system that is rechargeable from a variety of sources including an electric grid connection (where available), and from a portable solar photovoltaic panel, a portable wind power generator, or a portable hydropower generator when an electric grid connection is not available.

It would also be desirable to provide an improved battery pack power system that is readily usable with loads that operate on both AC and DC power. It would also be desirable to provide an improved battery pack system with an inverter module having a 'multi-standard' plug that is configured to receive any of a wide variety of electric plug configurations (such as the various types of AC power cords associated with the AC electric power systems of different countries), or other plug configurations such as USB plugs, 12 VDC cigarette lighter plugs, 12 VDC barrel plugs, and the like.

It would also be desirable to provide an improved battery pack power system that has a readily accessible fuse box to facilitate troubleshooting of the battery module and permit fuses to be checked and replaced quickly and conveniently.

It would also be desirable to provide an improved battery pack power system that includes an inverter module that is connectable to any one of the battery modules, where the inverter is capable of operating at either 110 VAC or 220 VAC by activation of a switch, and includes an indicator (e.g. light, meter, etc.) identifying the output voltage, and includes a convenient on/off switch to minimize unintentional drain on the battery module(s).

It would be desirable to provide an improved battery pack power system that includes any one or more of these advantageous features.

SUMMARY

According to one embodiment, a battery pack power system is provided that is (among others) modular, portable, stackable, electrically chainable, reconfigurable, and rechargeable. The system includes individual battery modules having various capacities that can be mixed and matched with one another to suit any of a wide variety applications or provide the desired power to any of a wide variety of loads (i.e. electrical devices, appliances, tools, portable medical equipment, communication devices, etc.). The individual battery modules are stackable or otherwise nestable or connectable with one another to permit one or more users to each separately carry or transport modules (e.g. in a pocket, or a backpack, or a purse, etc.) to a desired location (e.g. remote outpost, campsite, etc.) and then combine the modules to assemble the battery power pack (e.g. in a 'building block' manner or the like). The battery modules and/or an inverter module have a ventilation flow path that permits the free flow of air when the modules are connected to one another. The battery pack power system also includes flexible electrical connectors for "chaining" or otherwise electrically connecting the individual battery modules to one another (e.g. a 'plug-and-play' manner or the like) that permits only one-way, correct-orientation connection of modules to one another, and have no exposed electrically conductive surfaces. The modules further includes built-in storage ports or receptacles for retaining the flexible connectors when not in use. The individual battery modules include a charge indicator that identifies the real-time charge state of the module. The battery pack power system is rechargeable from a variety of sources including an electric grid connection, a vehicle 12 VDC connection, and a portable solar photovoltaic panel, portable wind power generator or portable hydropower generator and is readily usable with loads that operate on both AC and DC power. The battery pack power system also includes an inverter module having a 'multi-standard' socket configured to receive any of a wide variety of electric plug configurations, and includes sockets configured to receive other plug configurations including USB plugs. The battery modules include a readily accessible fuse box with a spring-biased door (e.g. cover, flap, etc.) to facilitate troubleshooting of the battery module and permit fuses to be checked and replaced quickly and conveniently. The inverter module is connectable to any one of the battery modules, and operates at either 110 VAC or 220 VAC or may be selectable between 110 VAC or 220 VAC by activation of a voltage selector switch, and includes an indicator light identifying the output voltage level, and includes an on/off switch to minimize unintentional drain on the battery module(s).

According to one embodiment, a battery pack power system is provided that includes a plurality of modular, portable, battery modules having various capacities that can be mixed and matched with one another into a first battery power pack configuration to provide power to a first load application, and then disassembled and re-assembled in a second battery power pack configured to provide power to a second load application. At least one of the battery modules comprises a first mounting interface. The battery pack power system includes one or more connectors for electrically chaining the battery modules to one another and an inverter module that is connectable to any one of the battery modules, and operates at either 110 VAC or 220 VAC, or may operate in both 110 VAC in a first mode and 220 VAC in a second mode. The inverter module comprises a second mounting interface, and the first mounting interface of the at least one battery module and the second mounting interface of the inverter module are configured to be coupled to one another to place the battery module and inverter module into a coupled configuration in which the inverter module and the battery module form a single integrated and substantially rigid structure.

BRIEF DESCRIPTION OF THE DRAWINGS

The disclosure will become more fully understood from the following detailed description, taken in conjunction with the accompanying figures, wherein like reference numerals refer to like elements, in which:

FIGS. 34A through 34H are schematic images of various views of a battery module for a battery pack power system according to an exemplary embodiment.

FIGS. 35A through 35H are schematic images of various views of an accessory module configured for coupling to the battery module shown in FIGS. 34A through 34H according to an exemplary embodiment.

FIGS. 36A through 36H are schematic images of various views of the battery module shown in FIGS. 34A through 34H and the accessory module shown in FIGS. 35A through 35H in a coupled configuration according to an exemplary embodiment.

DETAILED DESCRIPTION

Figure 1:
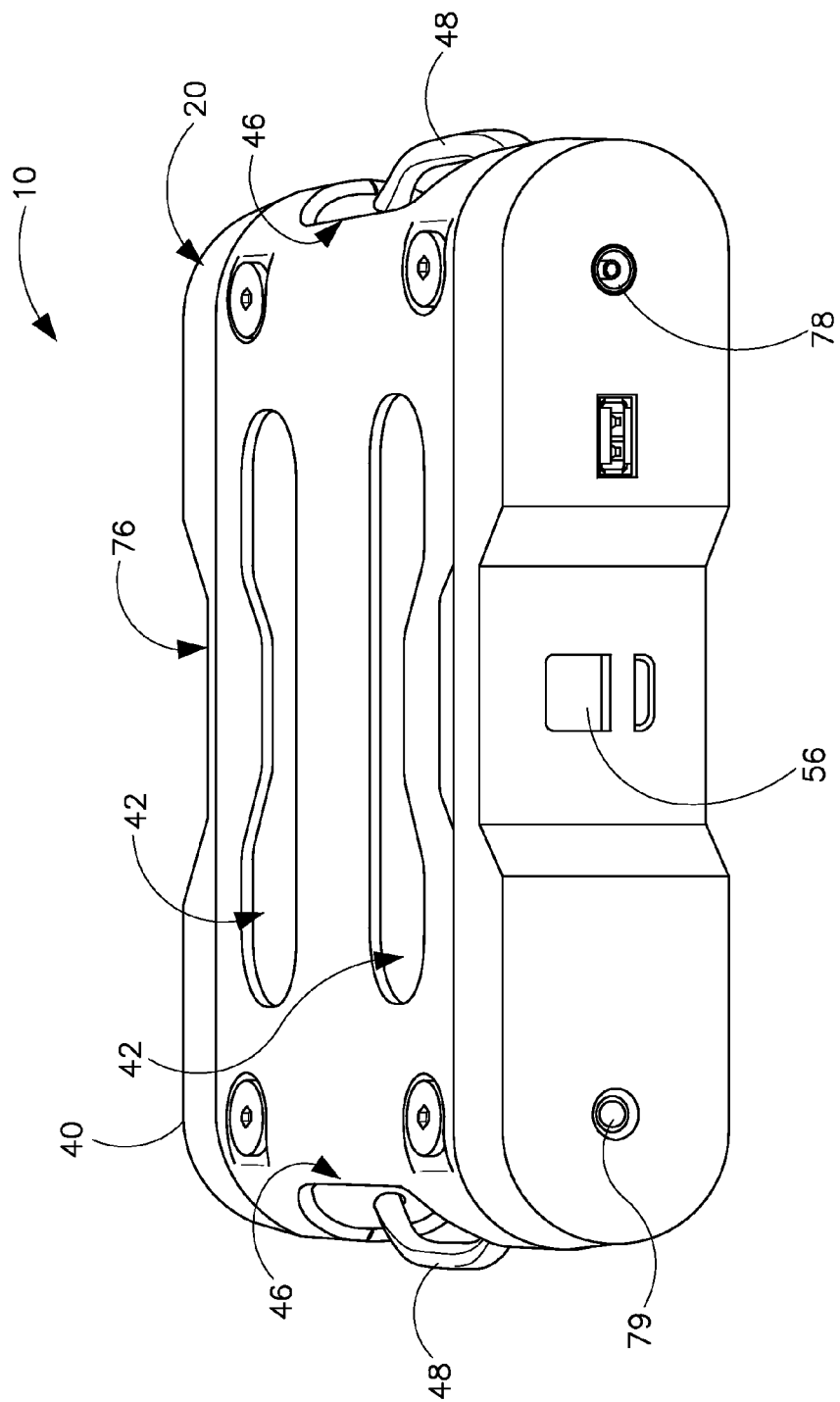
FIG. 1 is a schematic image of a front perspective view of a battery module for a battery pack power system with independent and stackable battery pack modules according to an exemplary embodiment.
Figure 2:
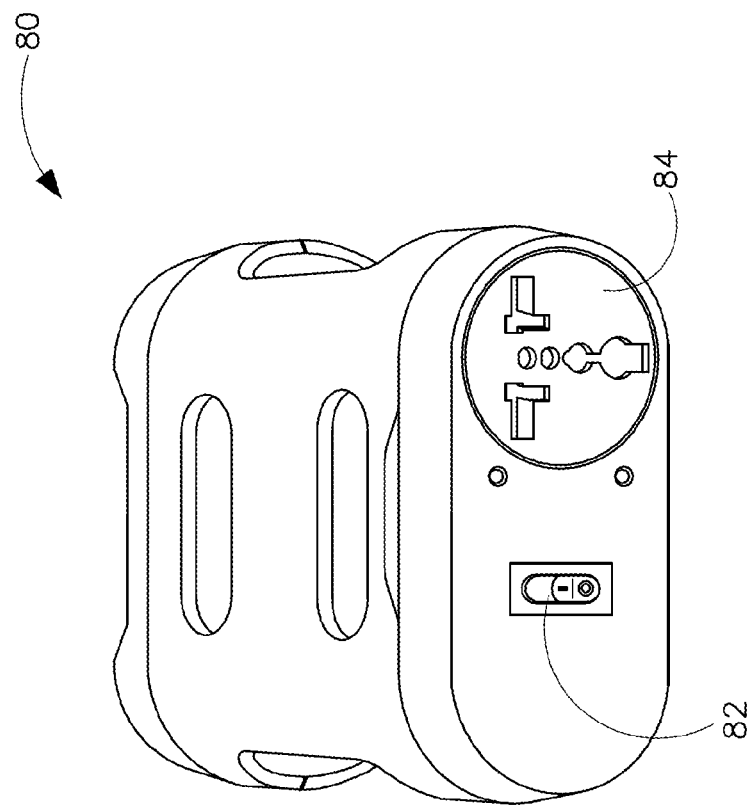
FIG. 2 is a schematic image of a front perspective view of an inverter module for a battery pack power system with independent and stackable battery pack modules according to an exemplary embodiment.

Before turning to the Figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-20, a battery pack power system 10 is shown according to a first exemplary embodiment. The battery pack power system 10 is shown to include a plurality of individual battery modules 20 (shown for example as two in FIGS. 4-12). The individual battery modules 20 may be provided in any of a variety of capacities so that a suitable number of battery modules 20 can be selected and combined to provide a desired power pack to suit an intended application and load device. According to one embodiment, a first-size battery module has a capacity of 120 watt-hours, and another-size battery module has a capacity of 50 watt-hours, and each battery module comprises a lithium ion phosphate battery material. However, according to alternative embodiments, other battery materials may be used, and any of a wide variety of capacities may be provided.

The battery modules 20 are also provided with electronic components including (among others) an input protection circuit, and output protection circuit, a charge controller, an LCD display controller and a temperature controller. The input protection circuit includes an input port that will shut down when the temperature exceeds a predetermined level (e.g. approximately 50 degrees C., etc.) to protect the battery from being overcharged, overheated or otherwise damaged. The output protection circuit includes output connection ports (e.g. inverter connection port, 12 VDC connectors, etc.) and other suitable electronic components for delivering electrical power from the battery to the outlet ports. The input and output ports are protected by a fuse having a suitable rating (e.g. 20 amps, etc.). The charge controller circuit regulates the charge to the battery module and includes protection by a readily accessible fuse, and also high temperature protection. The LCD display circuit detects the voltage of the battery and controls the LCD display that indicates the real-time charge of the battery module (e.g. 20%, 40%, 60%, 80%, Full, etc.). The Temperature controller includes a temperature detector that monitors the ground and DC input, such that when the temperature sensed by the detector exceeds a predetermined setpoint (e.g. approximately 50 degrees C. for example), it will cut power off. According to other embodiments, other control circuits, devices and components may be provided to suit particular applications and functions for the battery modules. An AC wall outlet adapter may also be provided that is operable to receive an electrical power input within the range of 100-240V AC, 50/60 Hz, and provide an output of approximately 15.3V DC, 3000 mA. A DC adapter may also be provided that provides power from a source such as a cigarette type lighter in a motor vehicle.

According to the illustrated embodiment of FIGS. 1-20, the modular nature of the individual battery modules 20 permits the modules to be custom-assembled into any desired configuration to power a desired load, and then readily disassembled and then reassembled in a different configuration to power another load application. The modular nature of the individual battery modules 20 permits the battery pack power system 10 to be separated into individual components or modules that are each more readily transported (e.g. by a single individual). For example, when desired for use at locations where transport of the assembled battery power pack system is impractical, such as (for example) hiking, camping, exploring, expeditioning, rafting, canoeing, search and rescue missions, providing power to electrical devices in areas where power is unavailable (e.g. temporarily lost—such as following storms or other natural disasters; or non-existent—such as in certain underdeveloped regions in the world, etc.), the disassembled modules 20 may each be carried or otherwise transported by separate members of a group to the location, where the modules 20 of the system 10 may then be quickly and conveniently assembled into a particular battery pack power system that is suited for the intended electrical loading conditions or devices to be powered. According to the embodiment of FIGS. 6-7, the device may be a light 30, such as a high-intensity 3 watt LED lamp 32 shown to include a stiff bendable wire 32 that may be provided at the end of a long cord, or may be plugged directly into the battery 20 (as shown), or other desirable size or type of lamp. According to other embodiments, the device may be any suitable device intended for use in locations without ready access to a grid-based source of electricity. For example, the device to be powered may be a portable medical device such as (for example) a continuous positive airway pressure breathing machine (C-PAP) that would permit a user with a medical condition (e.g. sleep apnea, etc.) to be able to enjoy outdoor or other activities that involve sleeping away from home and without access to grid-based electricity. According to other embodiments, the medical device may be any portable device intended to assist with any medical condition that might permit the user to gain mobility by having a readily transportable and remotely rechargeable battery pack power supply system.

Referring further to the embodiment of FIGS. 1-20, the battery modules 20 are shown to include a housing 40 having a uniquely designed shape that is intended to facilitate transport, nesting or connection to one another, ventilation, and electrical chaining to one another. The housing 40 includes a generally rectangular shape with elongated recesses 42 (e.g. nesting receptacles—shown for example as two receptacles) on one side, and corresponding nesting elements 44 (e.g. feet, projections, etc.) on the opposite side that are configured to mate with, or otherwise be received and retained within the receptacles 42 of an adjacent battery module 20. According to one embodiment, the nesting elements 44 are made from a resilient material (e.g. rubber, etc.) and may include 'tacky' or other non-slip properties or characteristics to cushion the battery modules 20 against one another, and help minimize relative movement of the modules 20 with respect to one another when the modules 20 are nested and secured together as an assembly.

Referring to FIGS. 5-9, the modules 20 may also include a suitable recess 46 along the opposite side walls and a retainer link 46 (e.g. loop, bar, wire, etc.), that is configured to receive a retainer strap 50 that may be configured to extend substantially around all of the modules 20 in the battery pack system and then tightened and secured to hold the modules 20 in a desired nested configuration.

According to an alternative embodiment, the modules may include additional interlocking (or interconnecting) structure, such as by way of example, dovetail slide-locks or the like. According to other alternative embodiments, the modules may include a suitable device, such as a latch, catch, clasp, etc. to lock one module to another module, until released by a user. Although the assembled configuration of the modules is shown by way of example to be a vertically stacked and nested arrangement, the modules of the battery pack power system are also capable of being configured in horizontally nested configurations. The housing may be formed from any suitable material or combination of materials, such as plastic, aluminum, etc.

Figure 3:
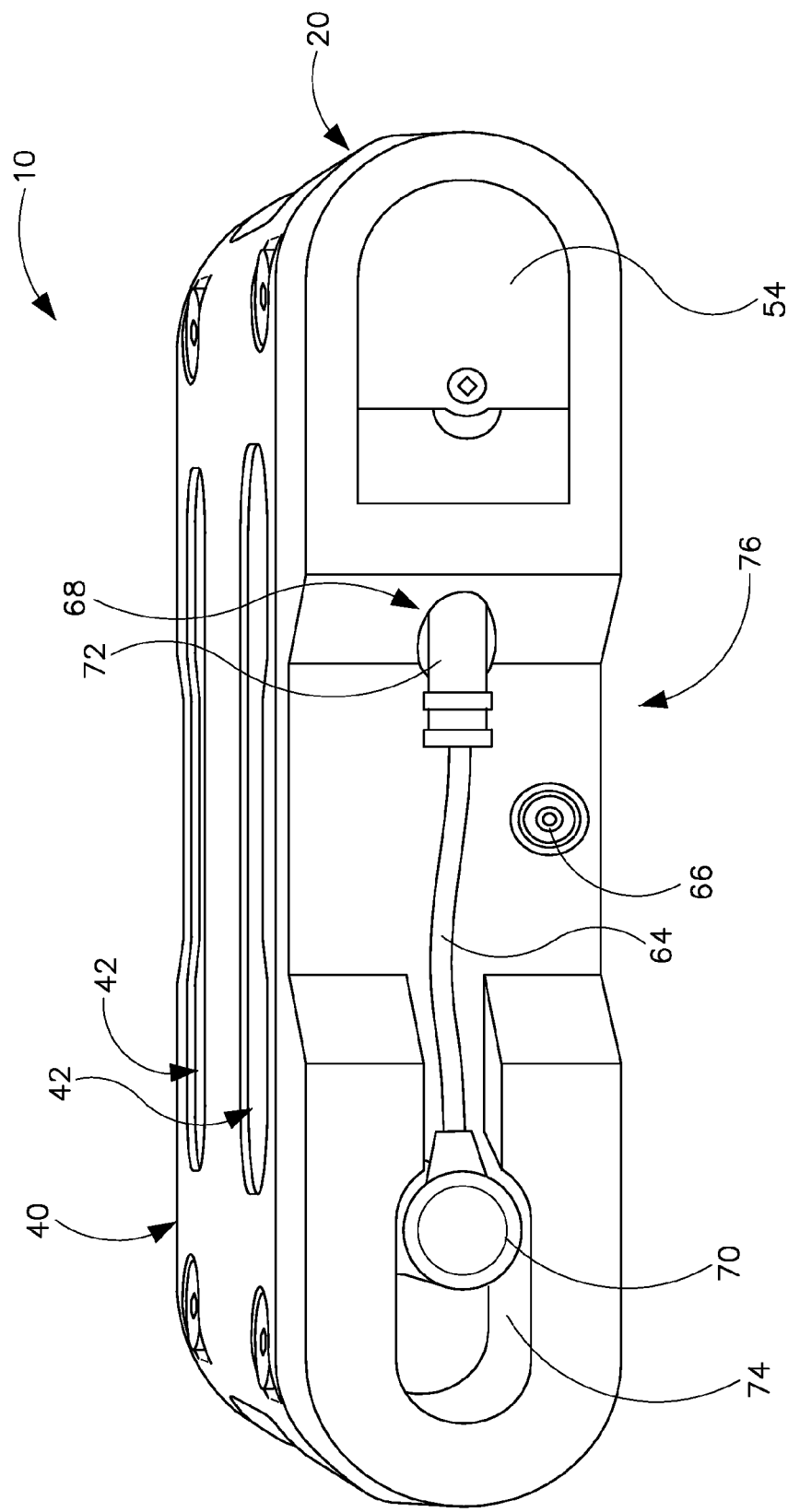
FIG. 3 is a schematic image of a rear perspective view of the battery module of FIG. 1, including the flexible electrical connector and its storage receptacles, and fuse box door according to an exemplary embodiment.
Figure 4:
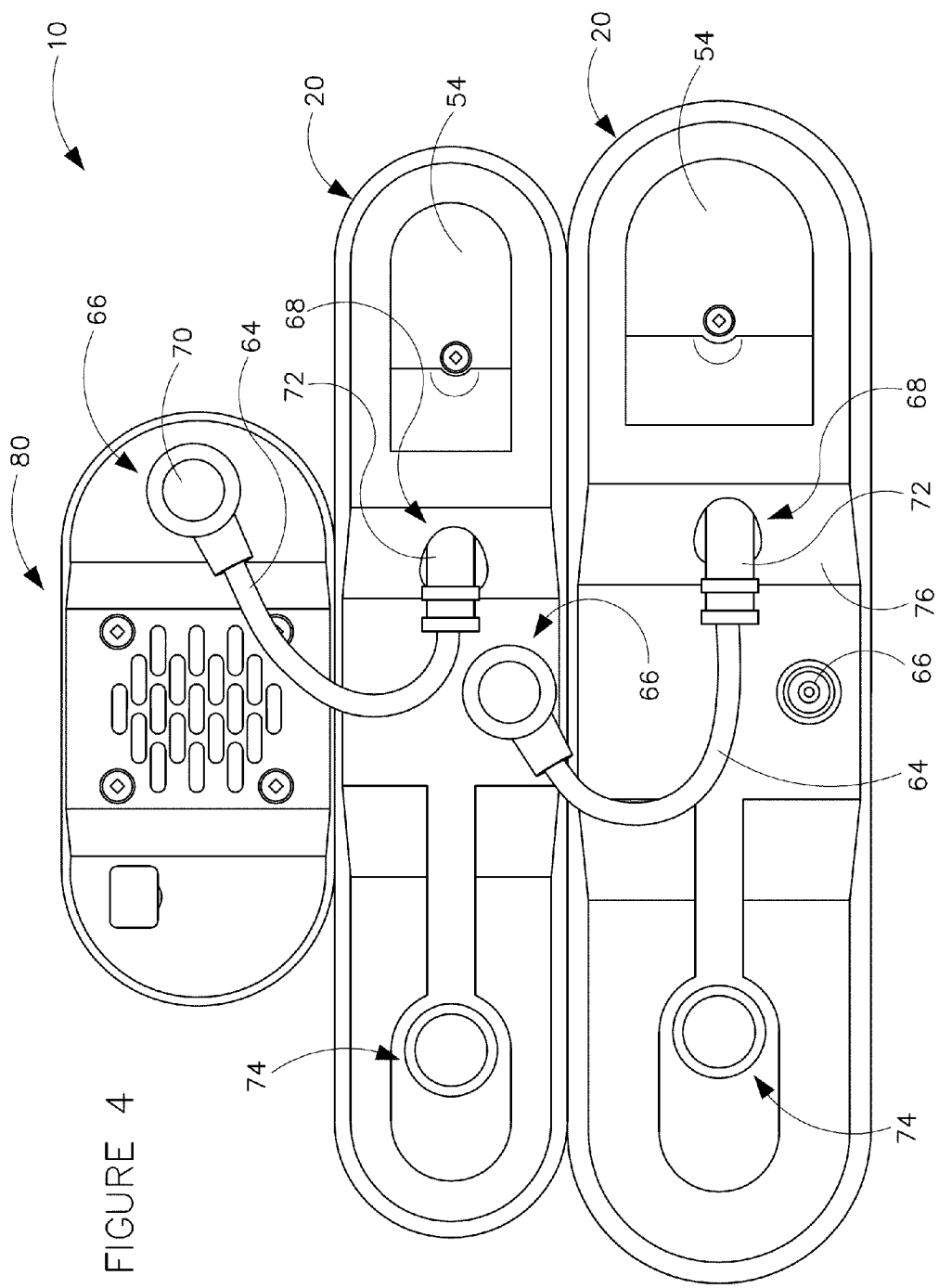
FIG. 4 is a schematic image of a rear perspective view of a battery pack power system with different size battery modules and an inverter nested together and interconnected by flexible electrical connectors in a chained, plug-and-play manner, according to an exemplary embodiment.
Figure 5:
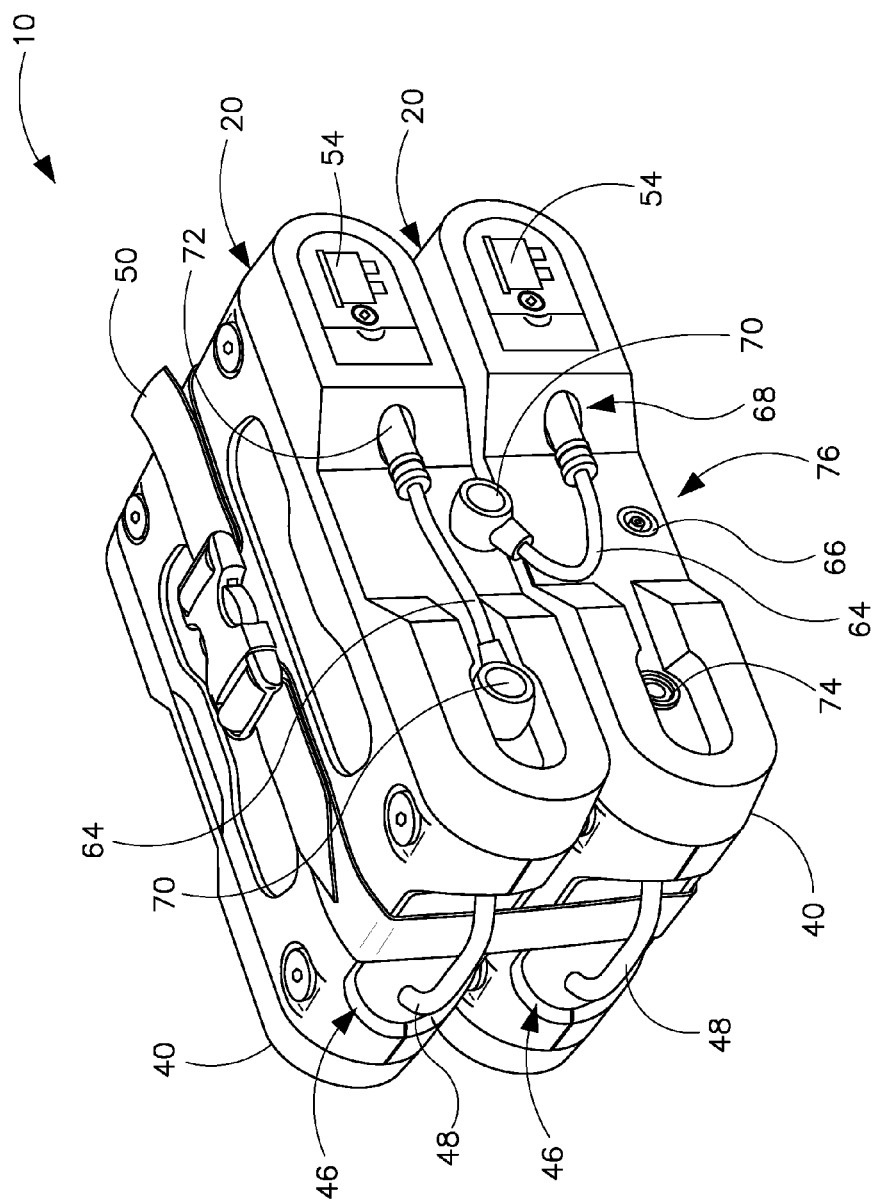
FIG. 5 is a schematic image of a rear perspective view of a battery pack power system with several same-size battery modules nested together and secured to one another and electrically interconnected by a flexible electrical connector in a chained, plug-and-play manner, according to an exemplary embodiment.
Figure 6:
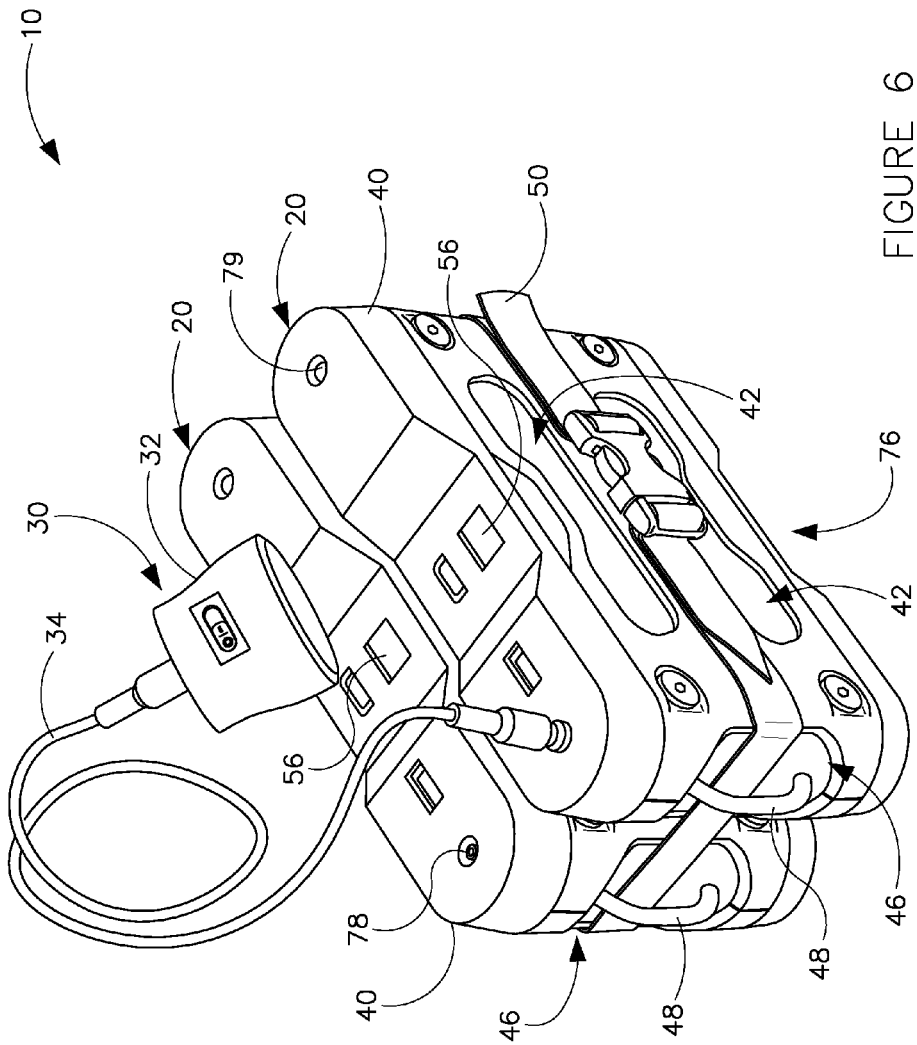
FIG. 6 is a schematic image of a perspective view of a battery pack power system with several same-size battery modules with nesting receptacles to facilitate nesting the battery modules together. E nested modules are secured to one another and electrically interconnected by a flexible electrical connector in a chained, plug-and-play manner, and providing power to an accessory (shown by way of example as a 3 watt LED lamp module) according to an exemplary embodiment.
Figure 7:
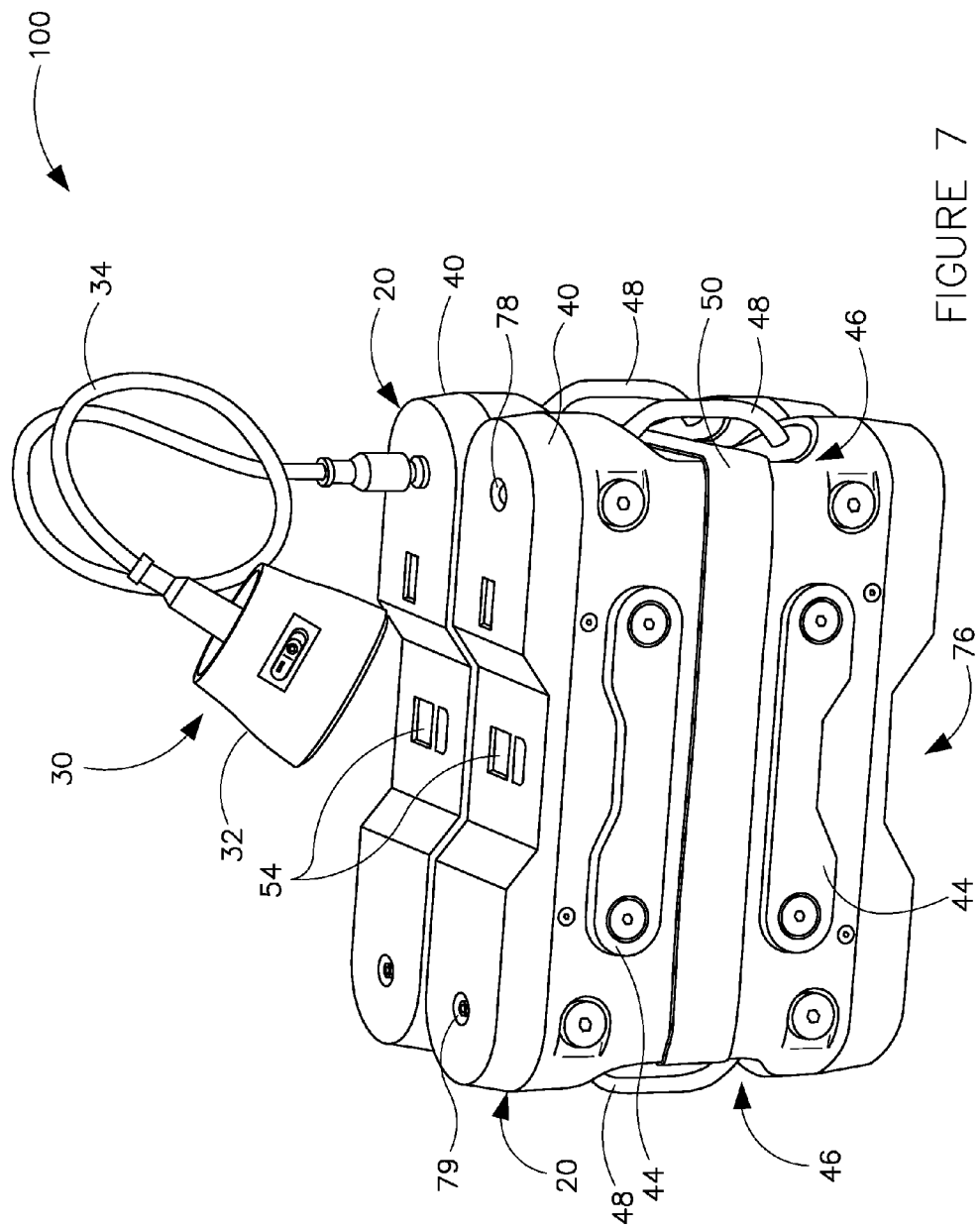
FIG. 7 is a schematic image of another perspective view of a battery pack power system of FIG. 6 with several same-size battery modules with nesting elements configured to mate with (and be received within) the nesting receptacles on an adjacent battery module to facilitate nesting the battery modules together. The nested battery modules are secured to one another and electrically interconnected by a flexible electrical connector in a chained, plug-and-play manner, and providing power to an accessory (shown as a lamp module) according to an exemplary embodiment.
Figure 8:
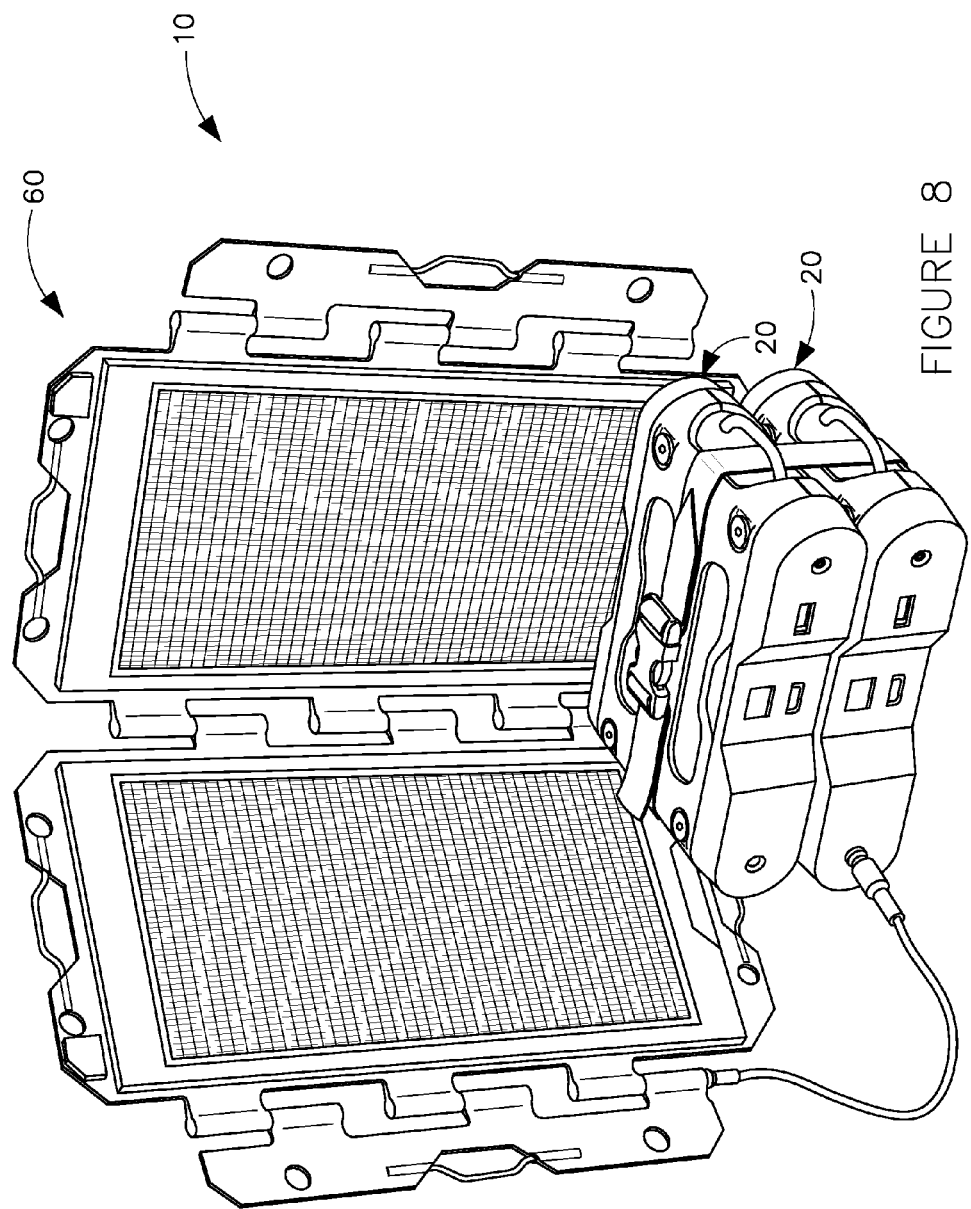
FIG. 8 is a schematic image of a perspective view of an off-grid solar photovoltaic recharging system for the battery pack power system according to an exemplary embodiment.
Figure 9:
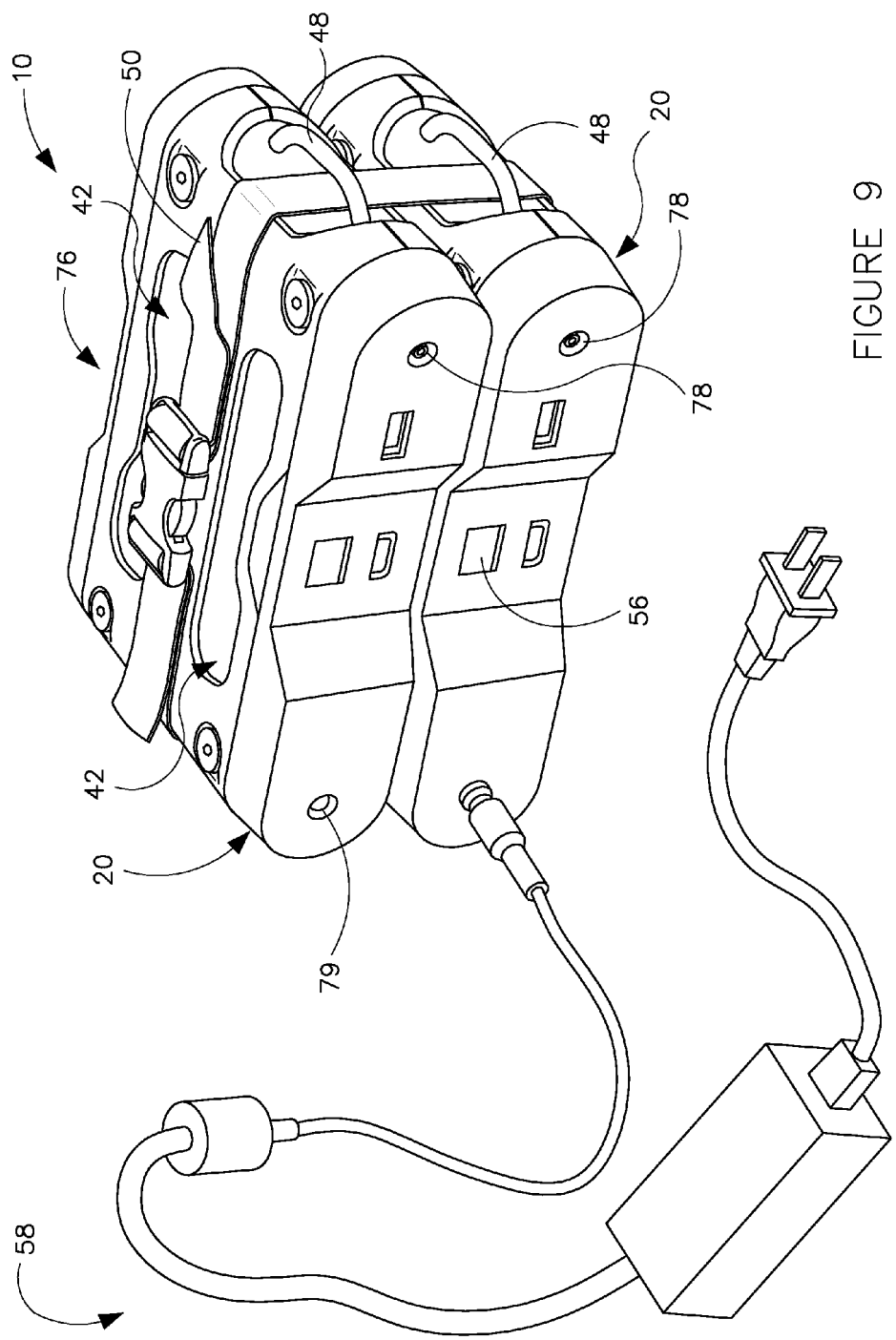
FIG. 9 is a schematic image of a perspective view of a grid-accessible recharging system for the battery pack power system according to an exemplary embodiment.
Figure 10:
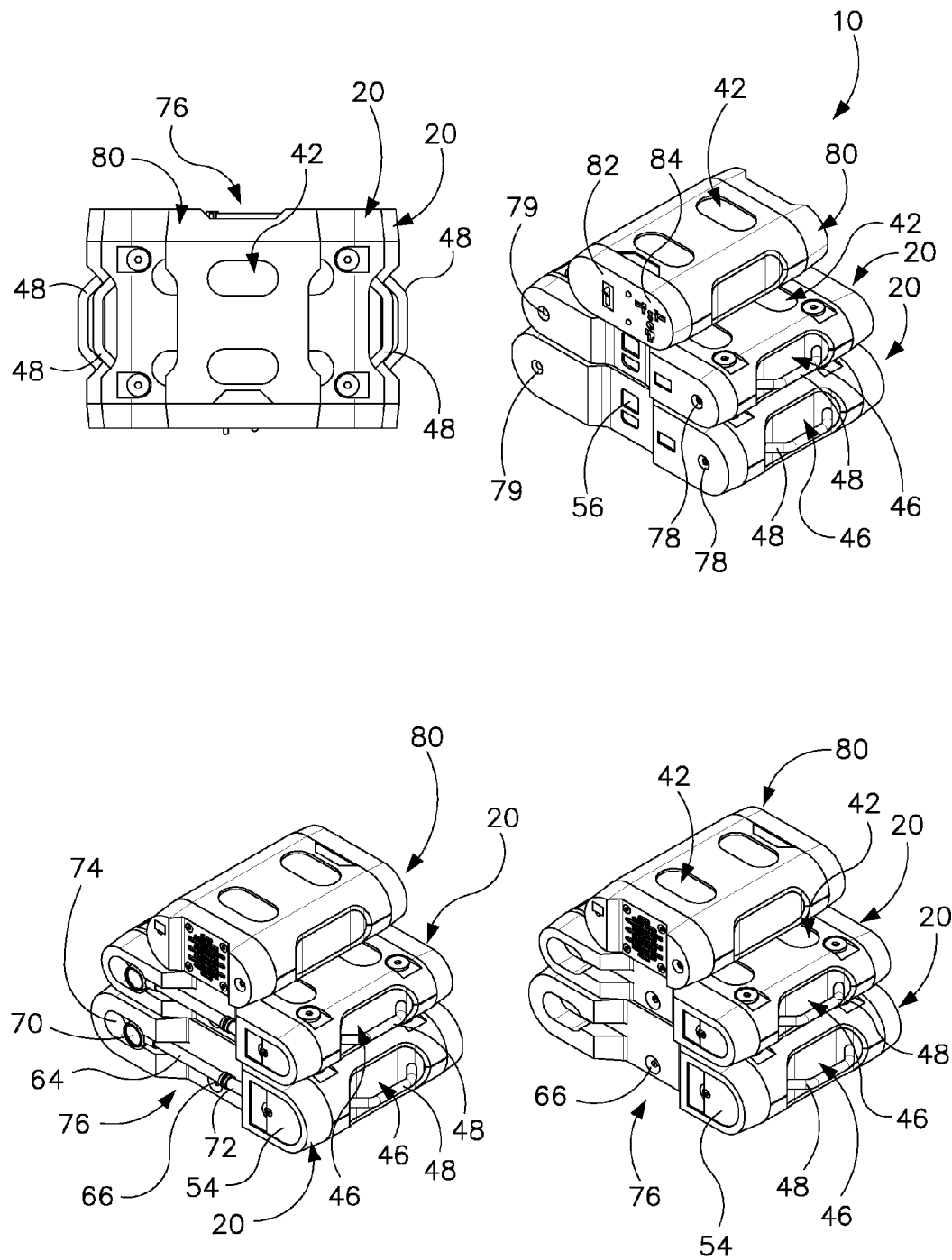
FIG. 10 is a schematic image of a top view and several perspective views of a battery pack power system including a stack of different-sized battery pack modules and an inverter module nested with one another according to an exemplary embodiment.
Figure 11:
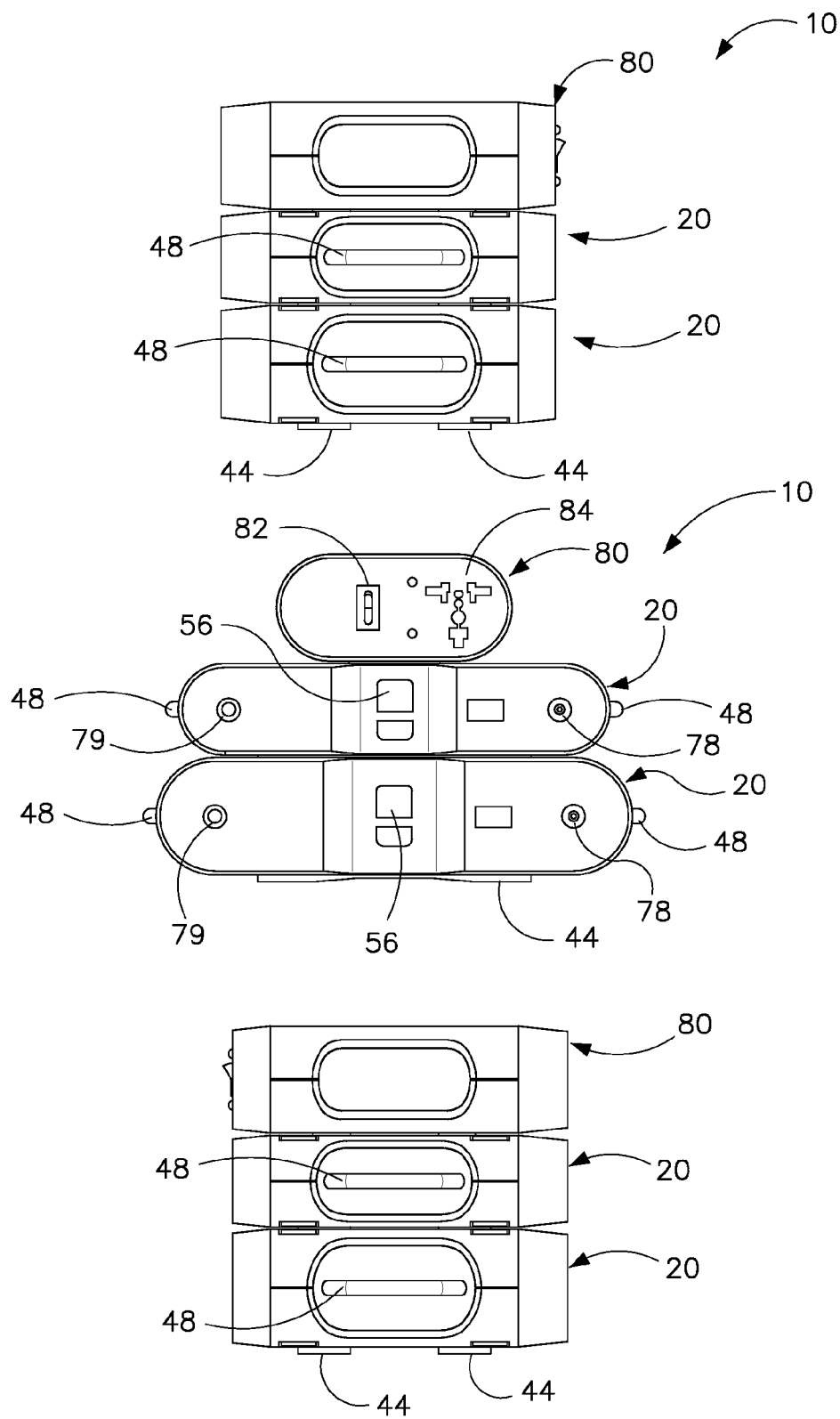
FIG. 11 is a schematic image of several elevation views of a battery pack power system including a stack of different-sized battery pack modules and an inverter module nested with one another according to an exemplary embodiment.
Figure 12:
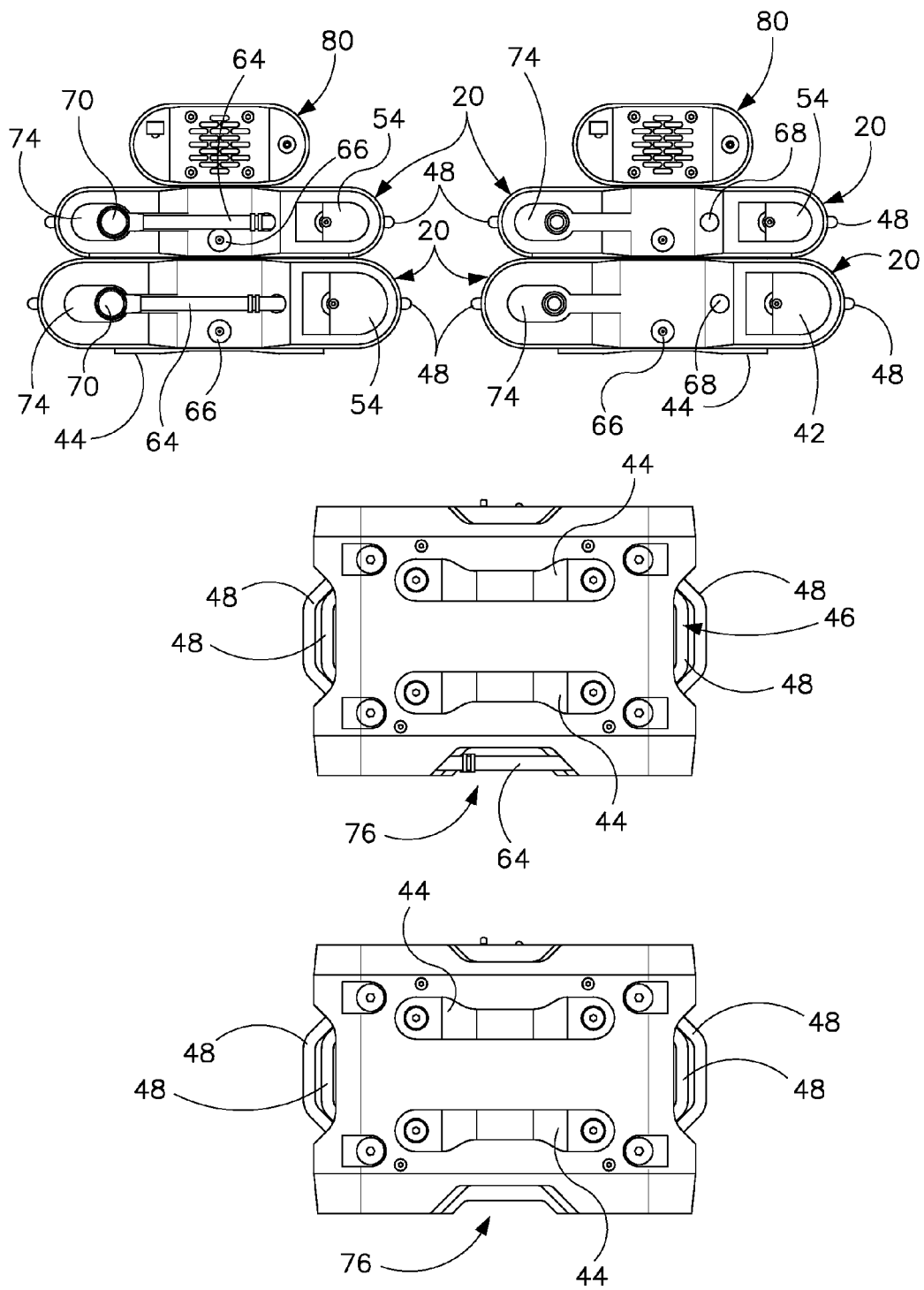
FIG. 12 is a schematic image of several elevation views and bottom views of a battery pack power system including a stack of different-sized battery pack modules and an inverter module nested with one another according to an exemplary embodiment.
Figure 13:
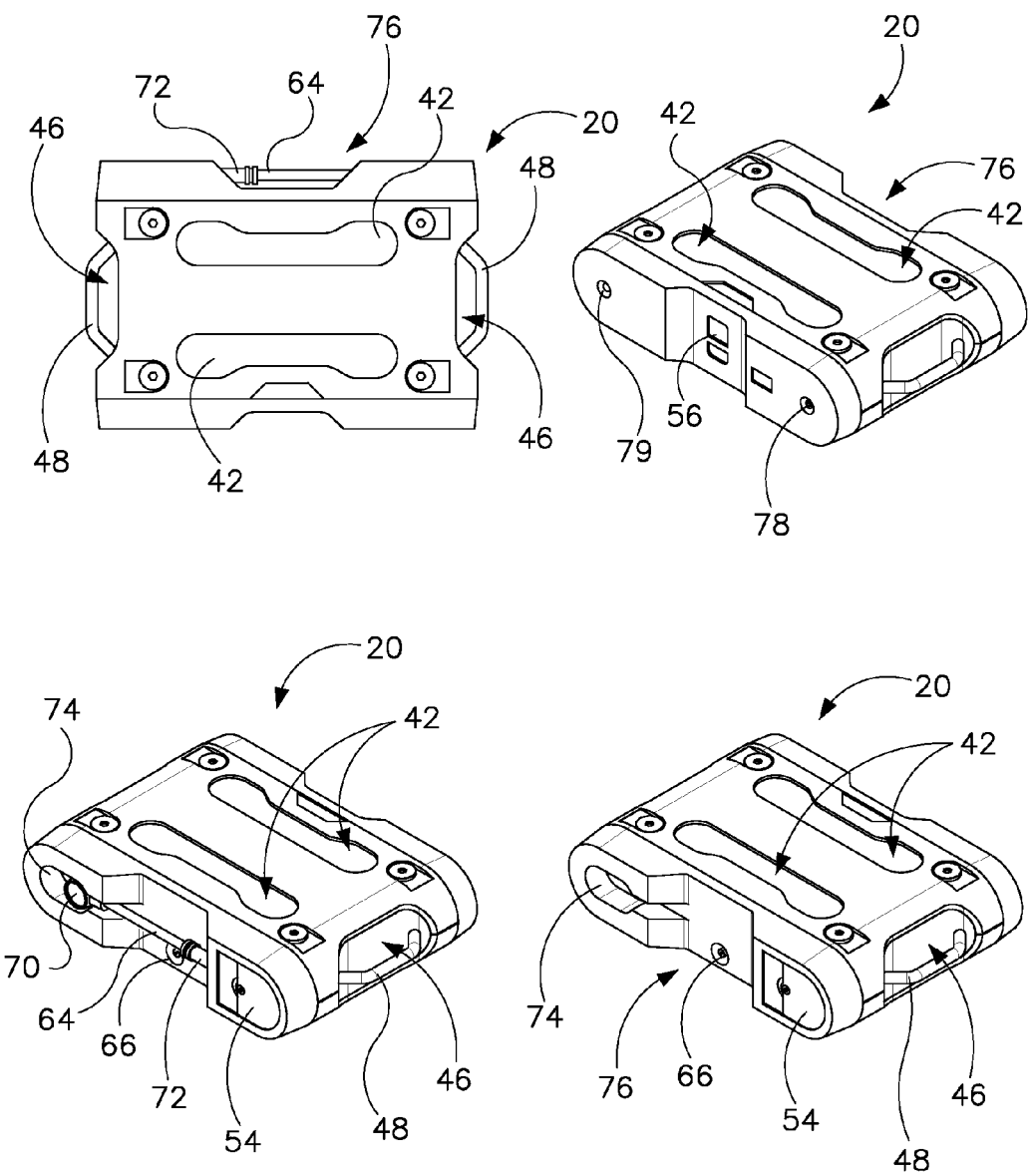
FIG. 13 is a schematic image of a top view and several perspective views of a first-size battery pack module according to an exemplary embodiment.
Figure 14:
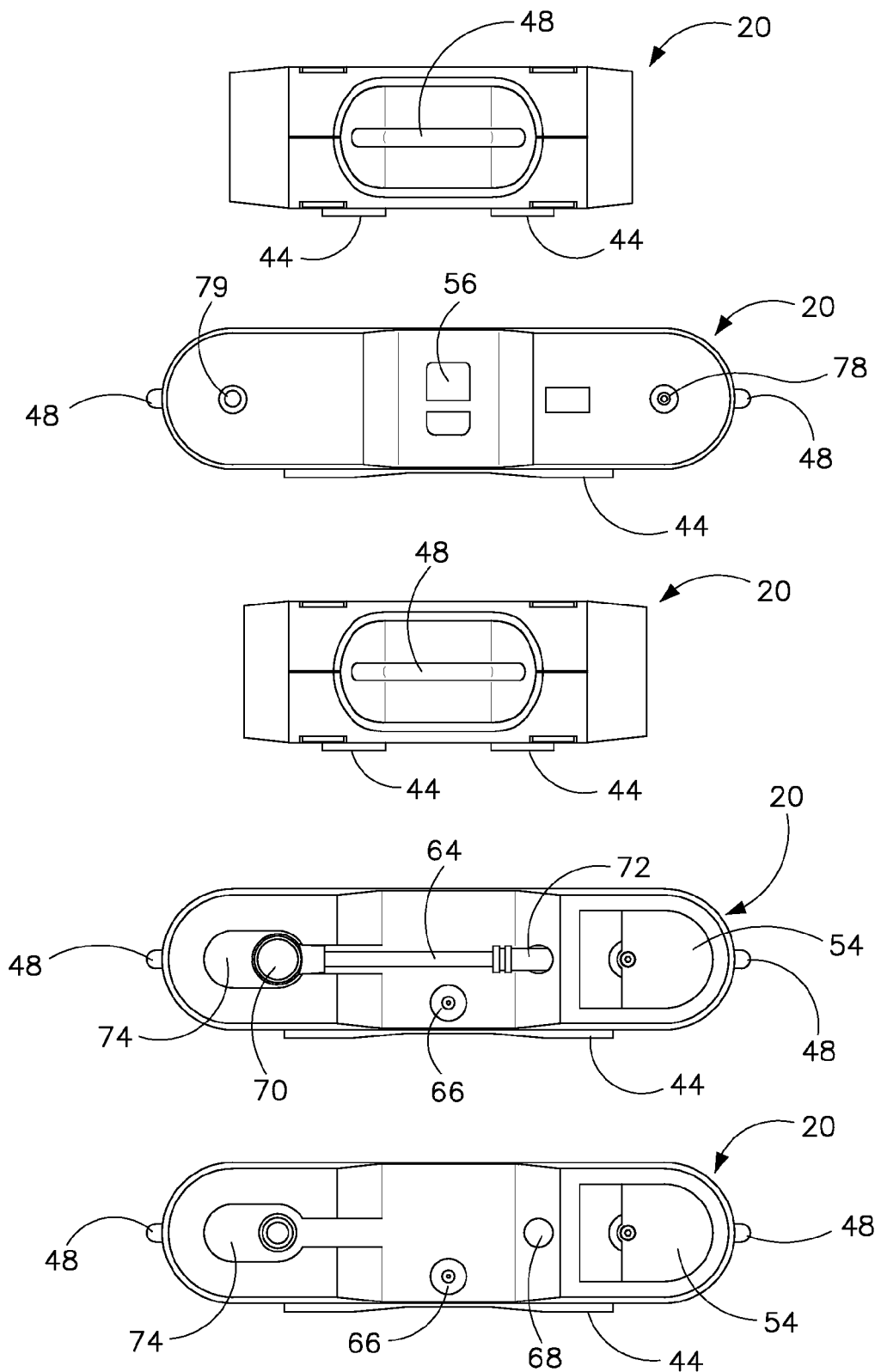
FIG. 14 is a schematic image of side and end elevation views of a first-size battery pack module according to an exemplary embodiment.
Figure 15:
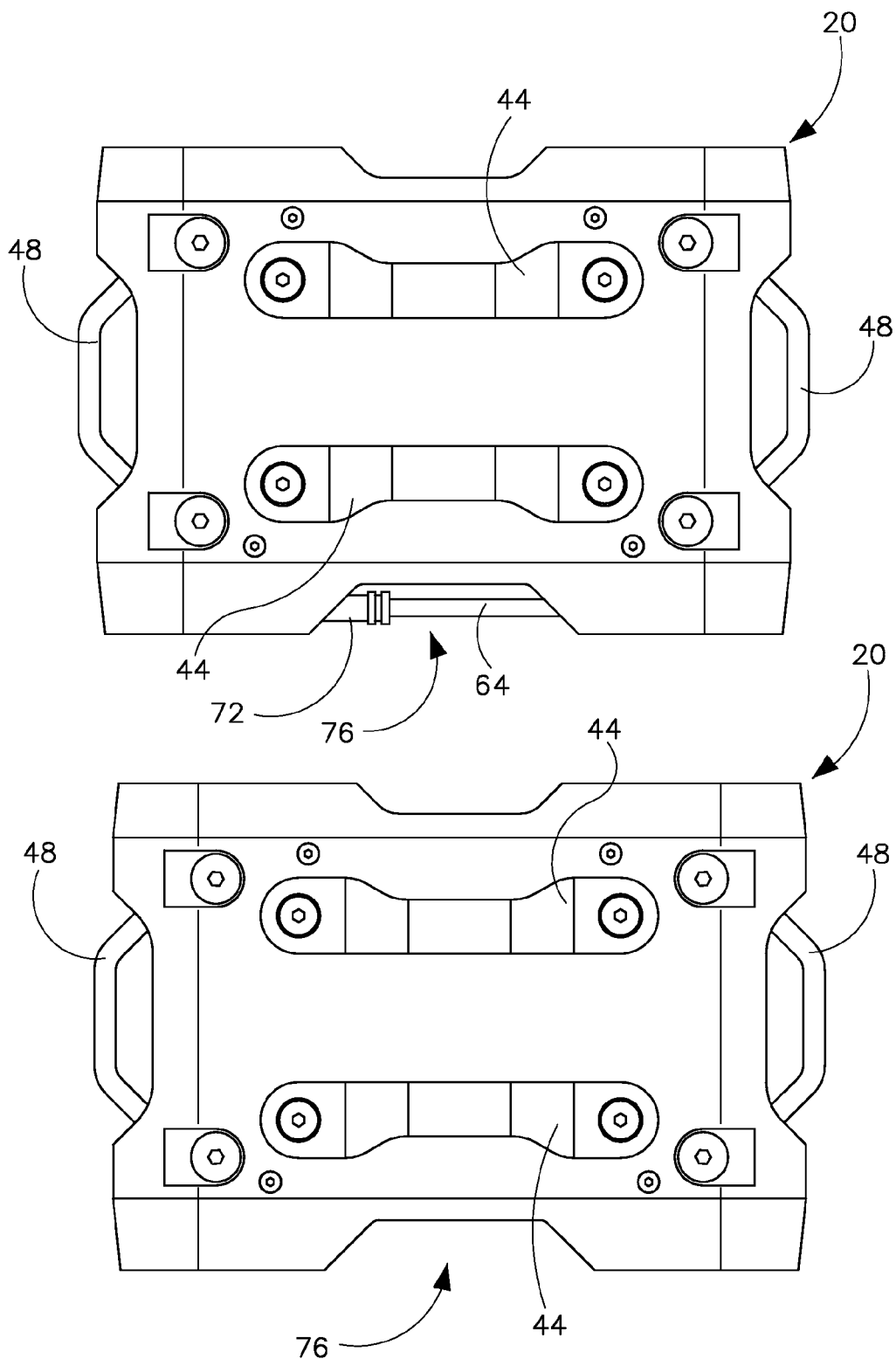
FIG. 15 is a schematic image of a top view and a bottom views of a first-size battery pack module according to an exemplary embodiment.
Figure 16:
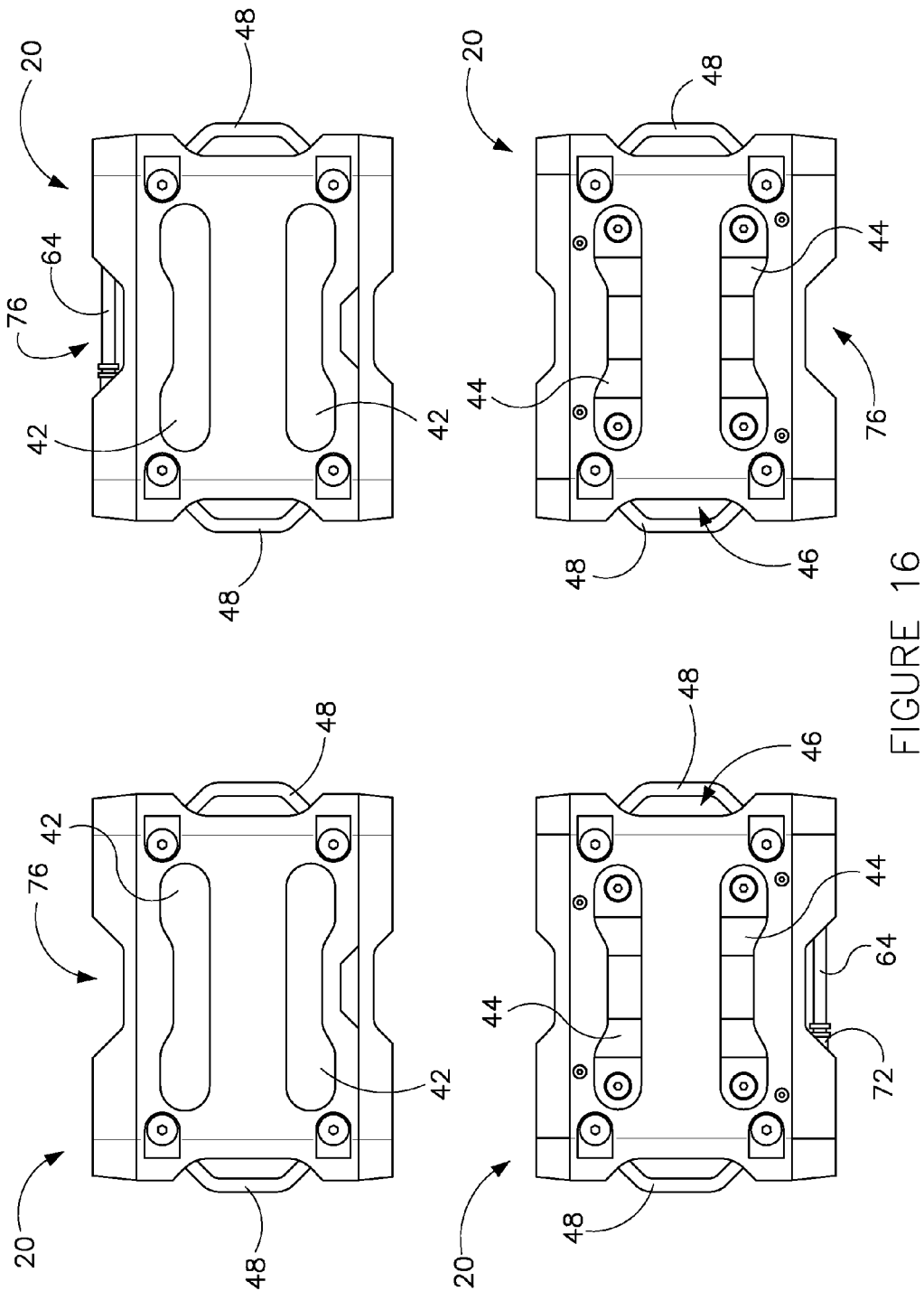
FIG. 16 is a schematic image of top and bottom views of another-size battery pack module, showing nesting receptacles and nesting elements according to an exemplary embodiment.
Figure 17:
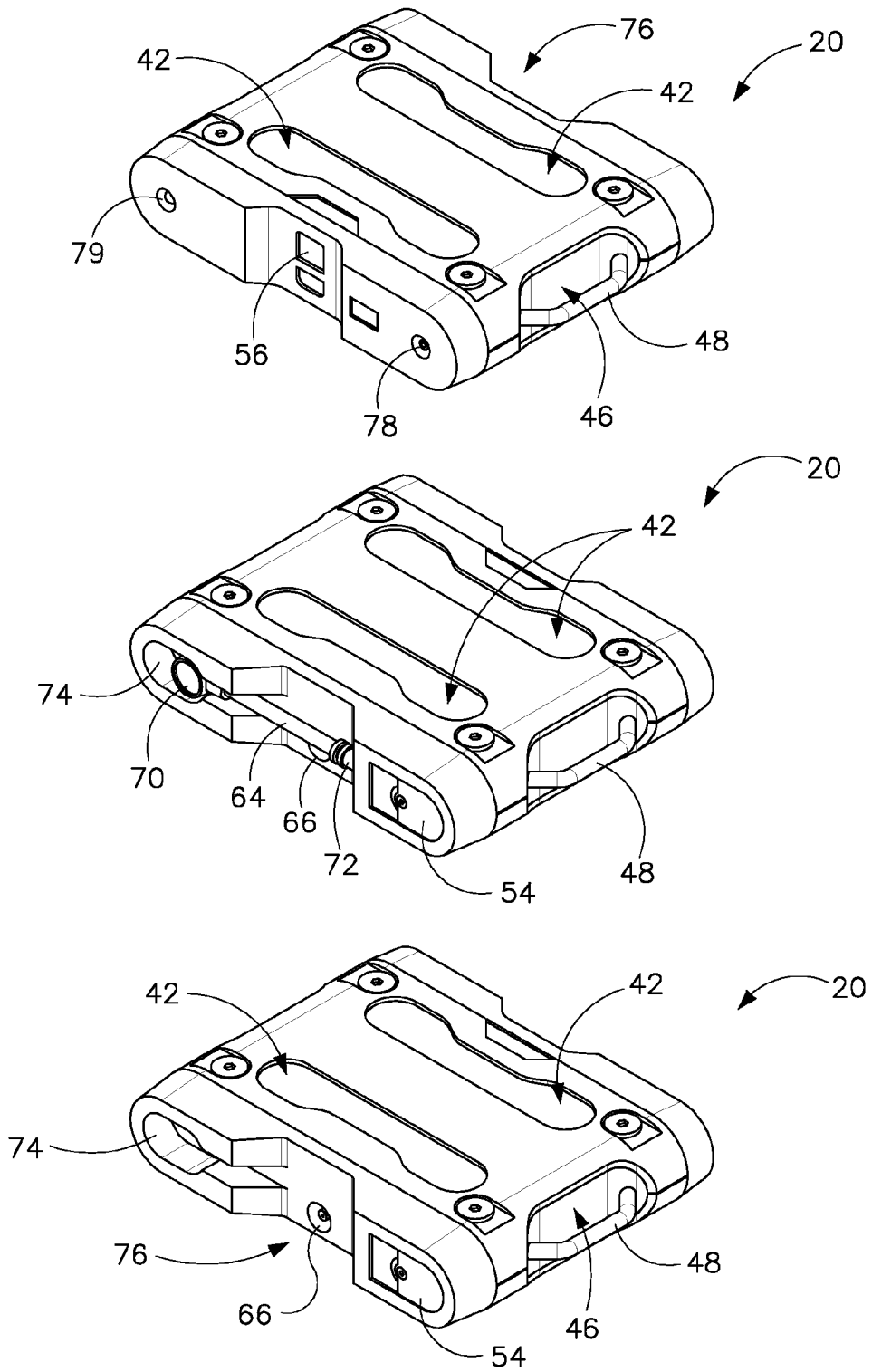
FIG. 17 is a schematic image of several perspective views of another-size battery pack module according to an exemplary embodiment.
Figure 18:
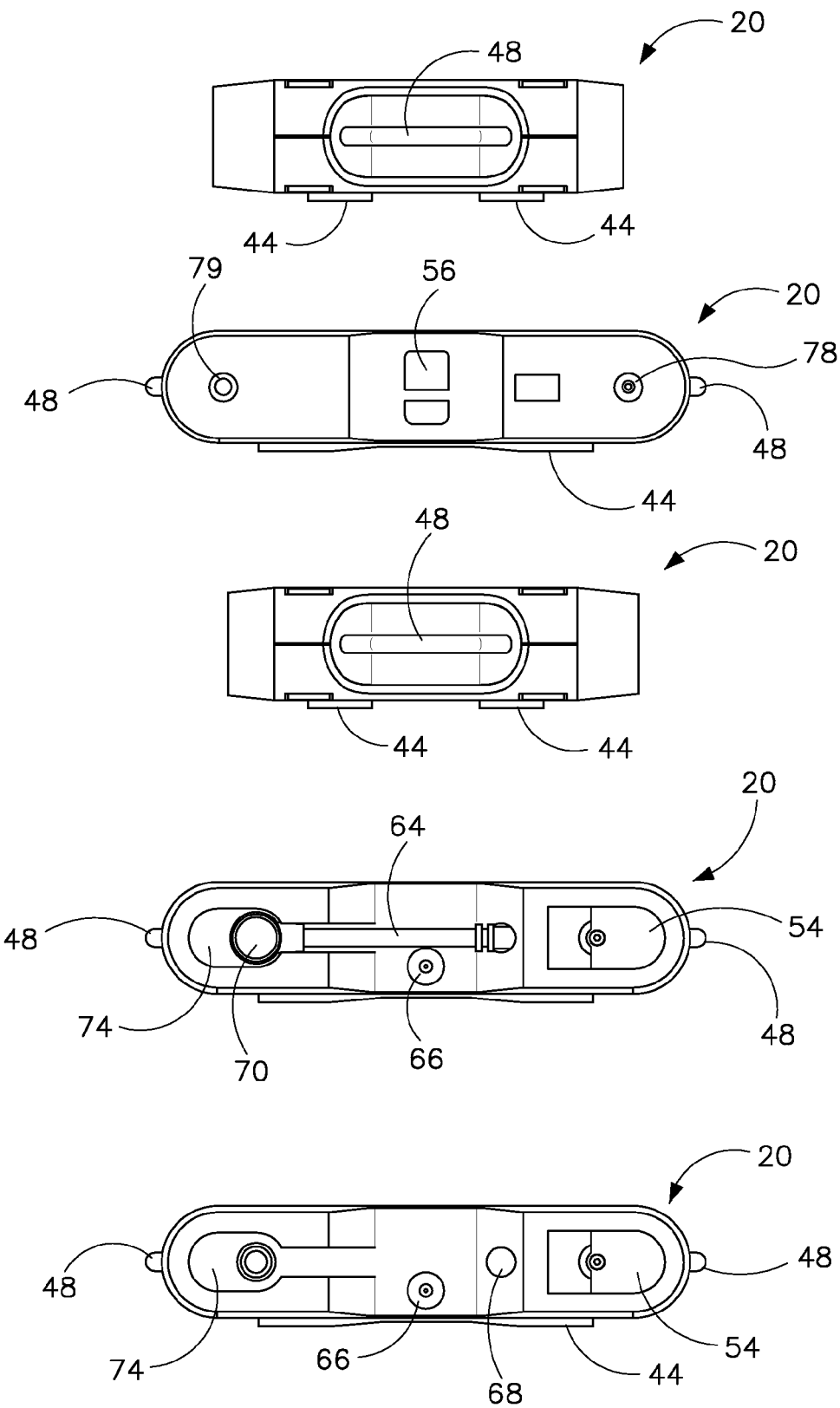
FIG. 18 is a schematic image of side and end elevation views of another-size battery pack module according to an exemplary embodiment.
Figure 19:
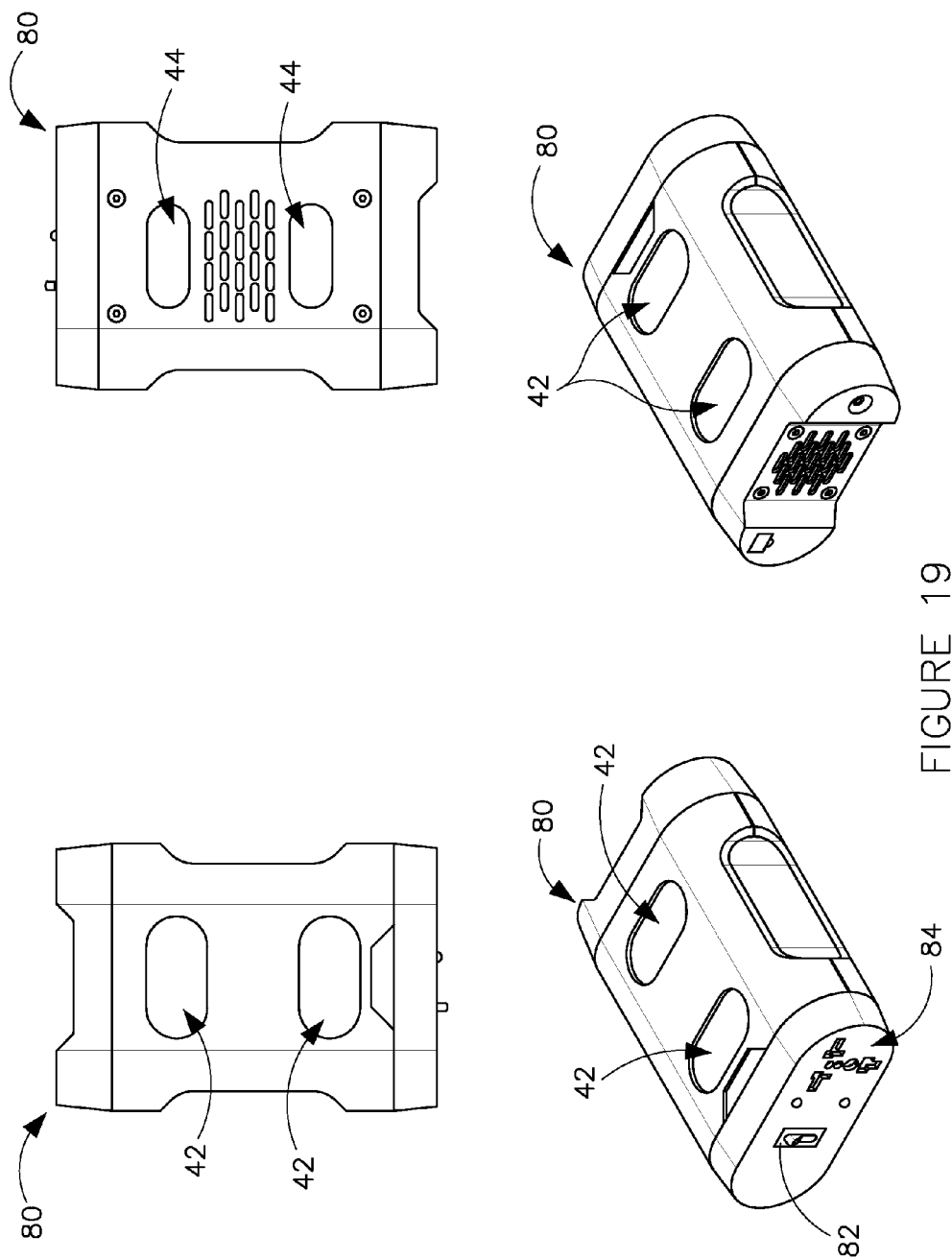
FIG. 19 is a schematic image of a top view, a bottom view and several perspective views of an inverter module according to an exemplary embodiment.
Figure 20:
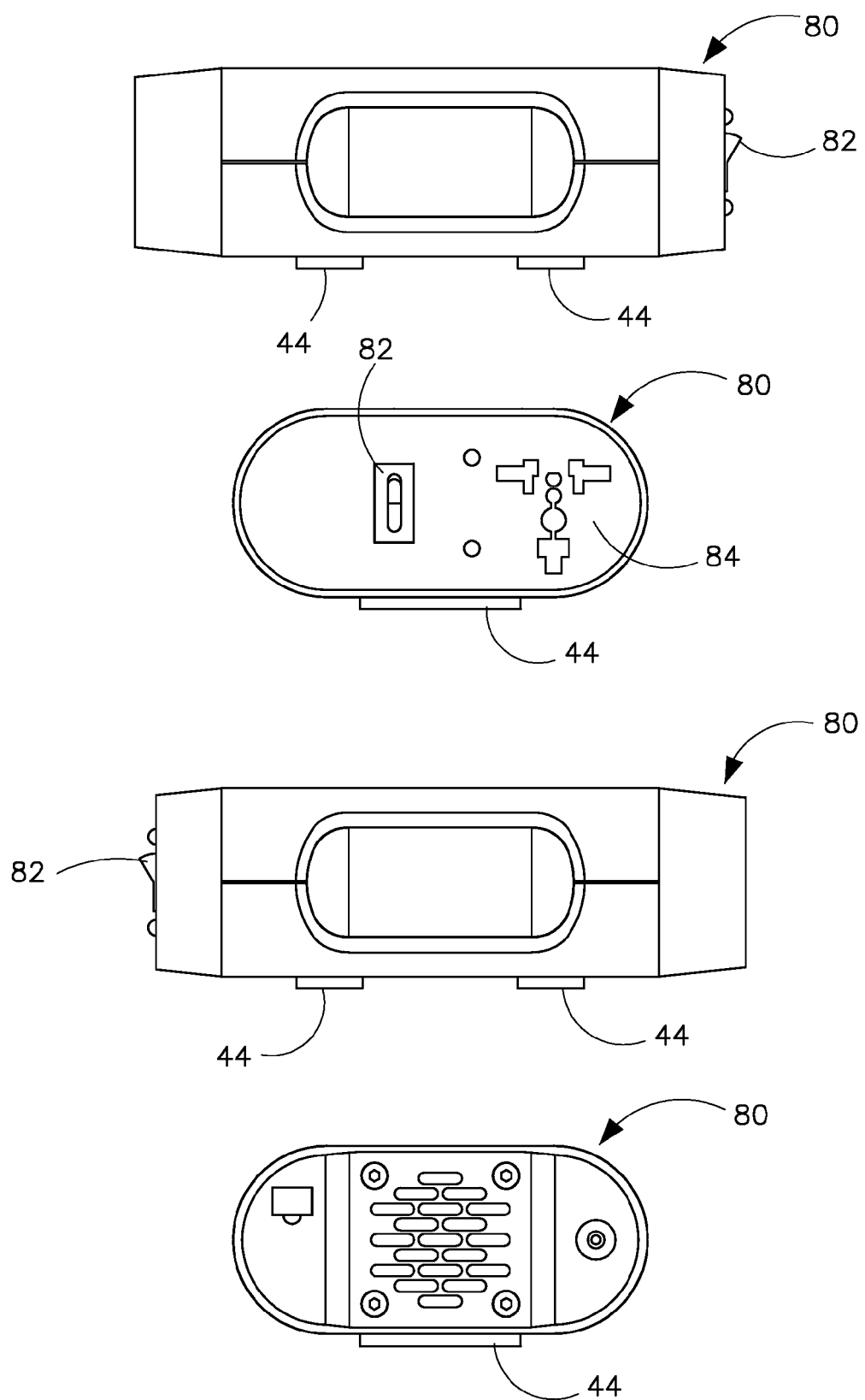
FIG. 20 is a schematic image of a side and end elevation views of an inverter module according to an exemplary embodiment.
Figure 21:
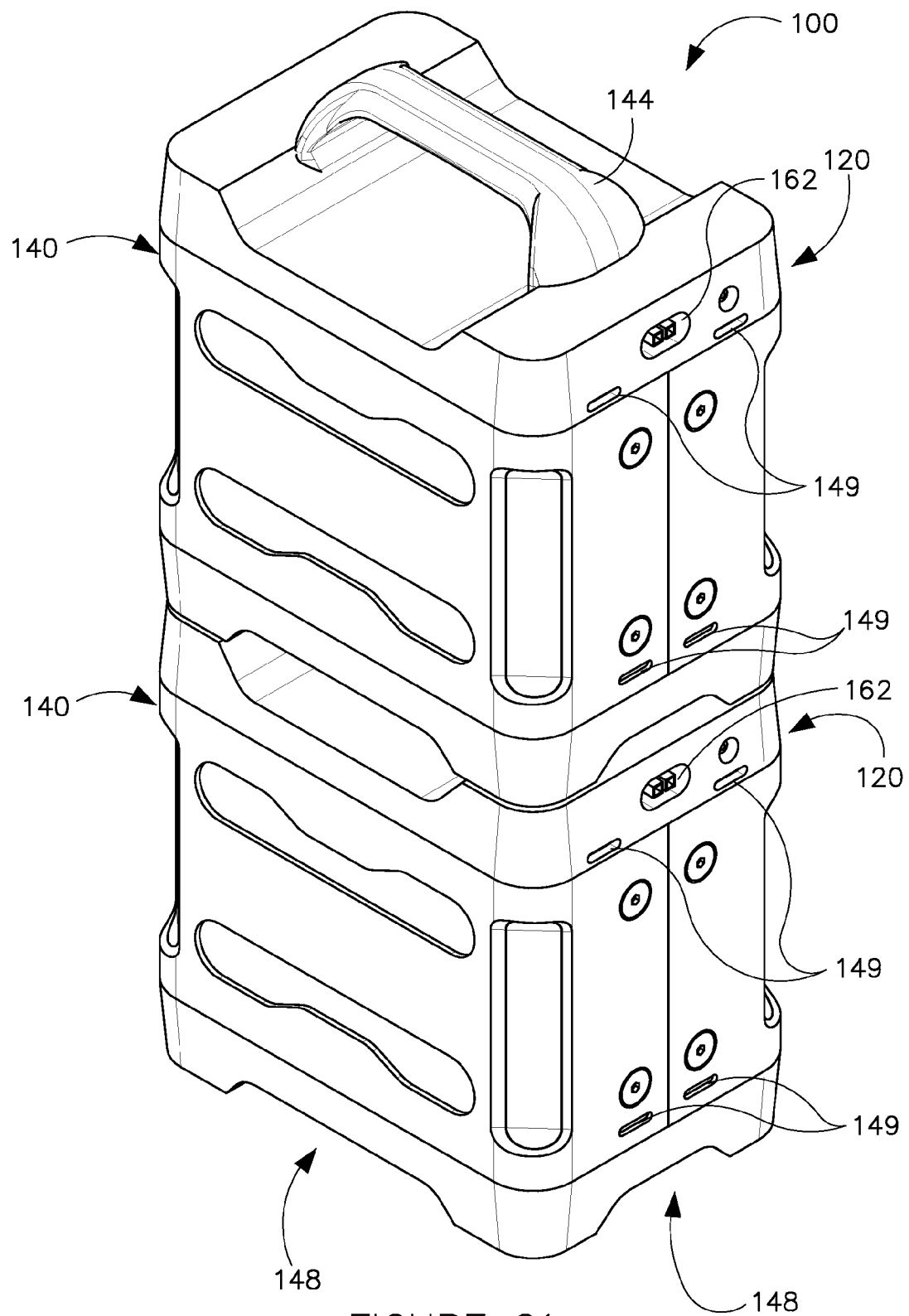
FIG. 21 is a schematic image of a perspective view of a battery pack power system with independent and stackable battery pack modules according to another exemplary embodiment.

Referring further to FIGS. 3-5, the individual battery modules 20 also include a readily accessible fuse box 54 with a spring-biased door (e.g. cover, flap, etc.) to facilitate troubleshooting of the battery module and permit fuses to be checked and replaced quickly and conveniently. FIGS. 1 and 6-9 illustrate that the individual battery modules 20 include a charge indicator 56 that identifies the real-time charge state of the module 20. The battery modules 20 of the battery pack power system 10 are rechargeable via input connector 79 from a variety of sources including an electric grid connection (where available) using a suitable AC to DC converter 58 that plugs into a standard 110/220 V wall outlet (see FIG. 9), or off-grid sources such as a vehicle 12 VDC connection (where available), and renewable sources such as a portable solar photovoltaic panel 60 (shown by way of example as a folding, portable PV module in FIG. 8), a portable wind power generator, and/or a portable hydropower generator (not shown, e.g. when other sources are unavailable).

Referring further to FIGS. 3-5, the battery pack power system is shown to include a flexible connection device 64 (e.g. cable, etc.) that facilitates rapid and convenient electrical interconnection (e.g. "chaining") of the battery modules 20 to one another, and to an individual module 20. According to the illustrated embodiment, the corresponding sockets 66, 68 on the modules have recessed electrical contacts that receive the mating barrel-type connector plugs 70, 72 on the flexible connection device 64, so that all live electrical contact surfaces are recessed to reduce the likelihood of inadvertent or unintentional contact that may cause shock or injury, or cause short circuits leading to damage of the components. The configuration of the plugs 70, 72 on the flexible connection device 64 permits only one-way, correct-orientation connection of modules 20 to one another. For example, the illustrated flexible connection device 64 has a first end with an in-line (e.g. coaxial) type connector 72, and a second end with a button-type connector 70 that extends generally perpendicular to the axis of the flexible connection device 64. When the flexible connection device 64 on one (or more) modules 20 is not in use, the button-type connector 70 on the second end can be safely stowed in a storage receptacle 74 to prevent loss or damage. The modules 20 are quickly and conveniently "chained" together electrically by simply removing the button-type connector 70 from the storage receptacle 74 and mating it with the corresponding chaining socket 66 on an adjacent unit 20. The next battery module 20 in the stack may then be chained to its next adjacent battery 20 in a similar manner (and so-on). The profile of the flexible electrical connector 64 is maintained at all times within the bottom boundary of the battery module 20 by strategic placement of a chaining recess 76 that contains the chaining socket 66 and the socket 68 for the first end of the flexible connection device.

The battery modules 20 of the system 10 may be used directly to provide DC power via output connector 78 to a wide variety of loads, and include suitable output connectors, such as (but not limited to) USB connectors, 12V barrel connectors, 12V cigarette lighter connectors, etc.

The battery modules 20 of the system may also be used with an inverter module 80 (see FIGS. 2 and 4) to provide AC power (e.g. 110 VAC, 220 VAC, etc.) to a wide variety of electrical load devices. The inverter module 80 is shown to nest directly any size battery module 20 and is retained in place by the nesting elements 44 and recesses 42 and secured by a retainer strap 50 (in a similar manner as previously described for the battery modules). The inverter module 80 includes a selector switch for operation at either 110 VAC or 220 VAC, and includes an indicator light identifying the output voltage level, and includes an on/off switch 82 to minimize unintentional drain on the battery module(s) 20. The inverter module 80 includes a number of output connectors, including a 'multi-standard' socket 84 configured to receive any of a wide variety of AC electric plug configurations, and includes sockets configured to receive other DC plug configurations including USB plugs, 12V barrel connectors, 12V cigarette lighter connectors, etc.

Referring to FIGS. 21-33, another battery pack power system 100 is shown by way of example as a relatively larger (yet still modular and portable) battery pack power system, according to an exemplary embodiment. The battery pack power system 100 of FIGS. 21-33 is shown to include a plurality of individual battery modules 120 (shown for example as two in FIGS. 21-26). The individual battery modules 120 may be provided in any of a variety of capacities so that a suitable number of battery modules 120 can be selected and combined to provide a desired power pack to suit an intended application and load device. According to one embodiment, the battery modules 120 have a capacity of approximately 400 watt-hours and comprise a lead-acid battery material. However, according to alternative embodiments, other battery materials may be used, and any of a wide variety of capacities may be provided.

The battery modules 120 are also provided with electronic components including (at least) an input protection circuit, and output protection circuit, a charge controller, an LCD display controller and a temperature controller. The input protection circuit includes an input port that will shut down when the temperature exceeds a predetermined level (e.g. approximately 50 degrees C., etc.) to protect the battery from being overcharged, overheated or otherwise damaged. The output protection circuit includes output connection ports (e.g. inverter connection port, 12 VDC connectors, etc.) and other suitable electronic components for delivering electrical power from the battery to the outlet ports. The input and output ports are protected by a fuse having a suitable rating (e.g. 20 amps, etc.). The charge controller circuit regulates the charge to the battery module and includes protection by a readily accessible fuse, and also high temperature protection. The LCD display circuit detects the voltage of the battery and controls the LCD display that indicates the real-time charge of the battery module (e.g. 20%, 40%, 60%, 80%, Full, etc.). The temperature controller includes a temperature detector that monitors the ground and DC input, such that when the temperature sensed by the detector exceeds a predetermined setpoint (e.g. approximately 50 degrees C. for example), it will cut power off. According to other embodiments, other control circuits, devices and components may be provided to suit particular applications and functions for the battery modules 120.

According to the illustrated embodiment, the modular nature of the individual battery modules 120 permits the modules to be custom-assembled into any desired configuration to power a desired load, and then readily disassembled and then reassembled in a different configuration to power another load application. The modular nature of the individual battery modules 120 permits the battery pack power system to be separated into individual components or modules that are each more readily transported (e.g. by a single individual). For example, when used in locations where transport of the assembled battery power pack system is impractical e g hiking, camping, exploring, expeditioning, search and rescue missions, providing power to electrical devices in areas where power is unavailable (e.g. temporarily lost—such as following storms or other natural disasters; or non-existent—such as in certain underdeveloped regions in the world, etc.), the disassembled modules 120 may each be transported by separate members of a group to the location, where the modules 120 of the system may then be quickly and conveniently assembled into a particular battery pack power system that is suited for the intended electrical loading conditions.

Referring further to FIGS. 21-33, the battery modules 120 are shown to include a housing 140 having a uniquely designed shape that is intended to facilitate transport, nesting or connection to one another, ventilation, and electrical chaining to one another. The housing 140 includes a generally rectangular shape with an elongated handle 144 extending lengthwise and projecting above the top surface of the module 120. The housing 140 also includes a recess 142 (e.g. pocket, well, receptacle, socket, etc. see FIG. 33) on a bottom surface of the module that is configured (e.g. shaped and sized, etc.) to securely receive the handle 144 from another module 120. The recess 142 may receive a handle 144 from an adjacent module 120 in any suitable manner, such as an interference fit, that is intended to keep the modules 120 connected to one another once assembled during normal usage. According to an alternative embodiment, the modules may include additional interlocking (or interconnecting) structure, such as by way of example, dovetail slide-locks or the like. According to other alternative embodiments, the modules may include a suitable device, such as a latch, catch, clasp, etc. to lock one module to another module, until released by a user. According to yet another alternative embodiment, the modules may also include a suitable recess along the front and rear walls, or the opposite side walls, that is configured to receive a retainer strap that may be configured to extend substantially around all of the modules in the battery pack system and then tightened and secured to hold the modules in a desired configuration. Although the assembled configuration of the modules is shown by way of example to be a vertically stacked and nested arrangement, the modules of the battery pack power system are also capable of being configured in horizontally nested configurations. The housing may be formed from any suitable material or combination of materials, such as plastic, aluminum, etc.

Figure 33:
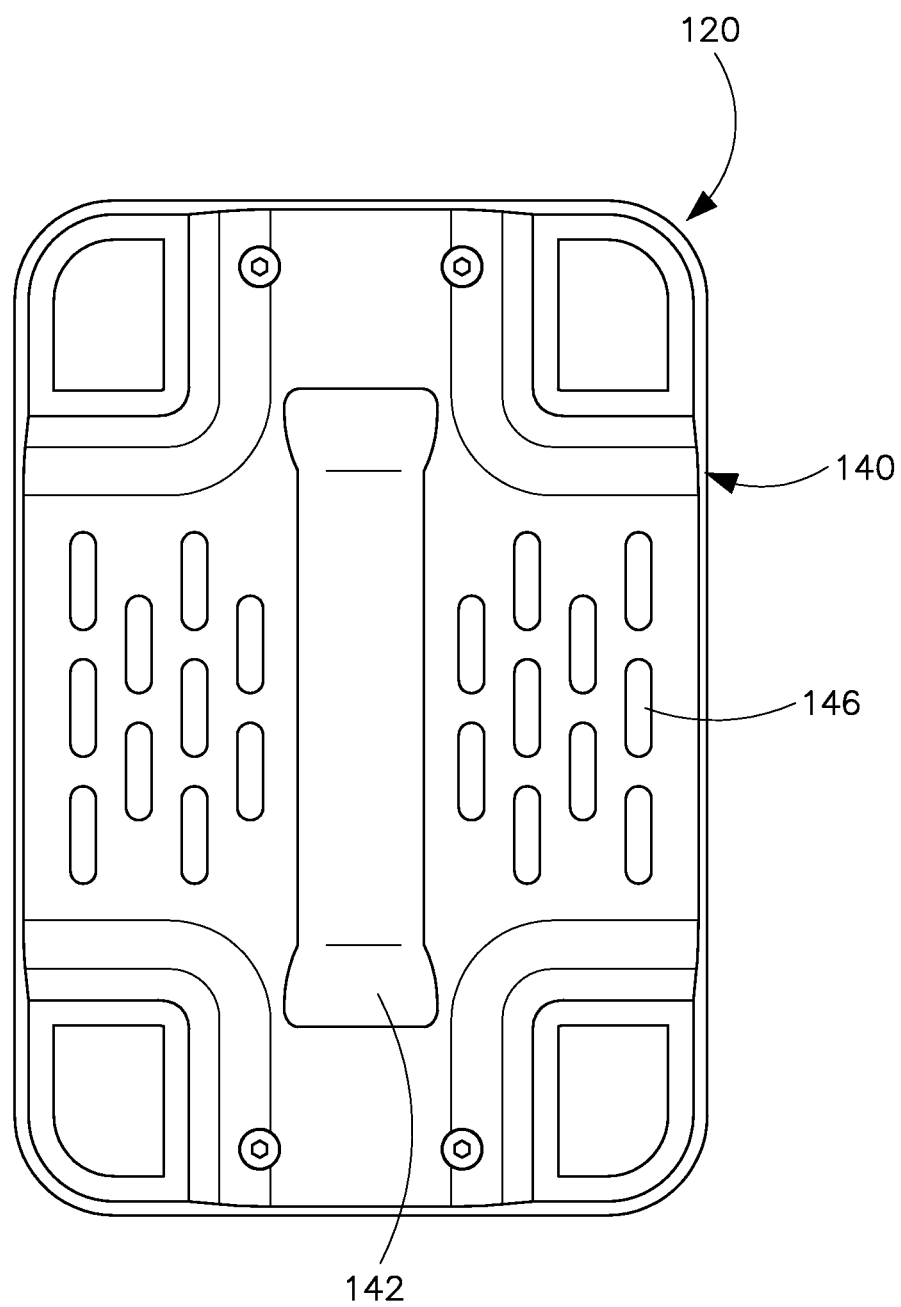
FIG. 33 is a schematic image of a bottom view of an individual battery module for the battery pack power system of FIG. 21 according to an exemplary embodiment.
Figure 34A:
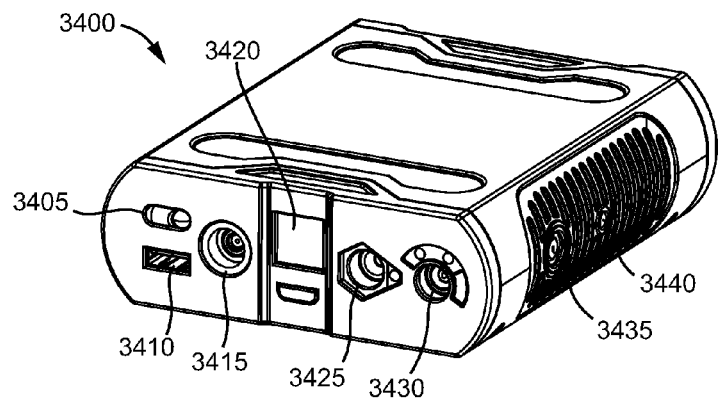
Figure 35A:
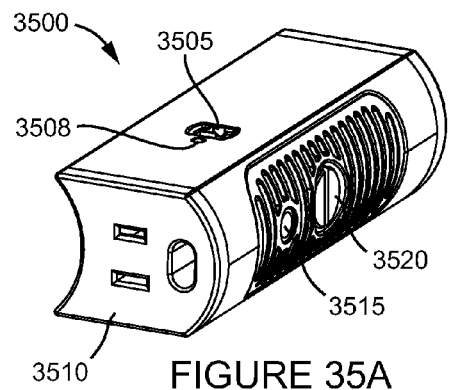
Figure 36A:
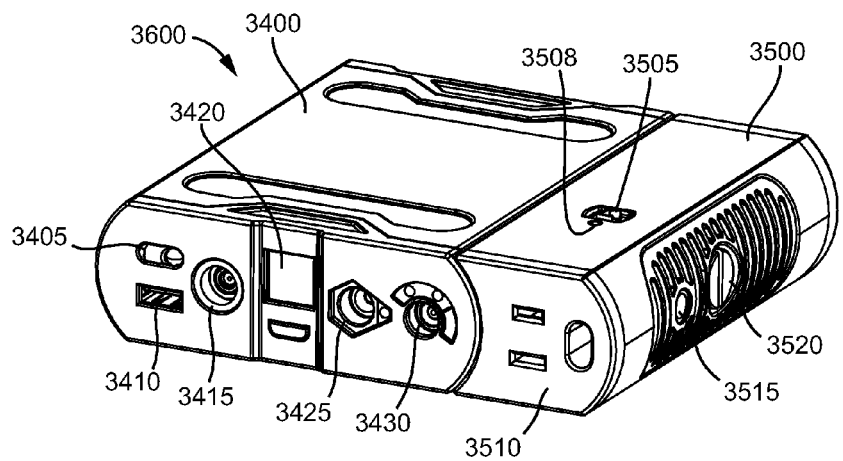

Referring further to FIG. 33, the housing 140 includes a number of apertures 146 (e.g. vents, slots, ports, etc.) that define a ventilation air flow path for the battery modules. The apertures are shown for example as arranged in a pattern on a recessed portion 148 of the bottom surface of the module (see FIG. 33), so that once nested with, or connected to, an adjacent module 120, a space is provided that permits air flow between the top of one module 120 and the bottom of another module 120 to be drawn in through the bottom of the module 120 and then out through apertures 149 arranged along the walls of the module. The ventilation design is intended to minimize openings on the top of the module to enhance resistance to weather elements, and to permit unimpeded air flow when the modules are nested one atop another.

Figure 27:
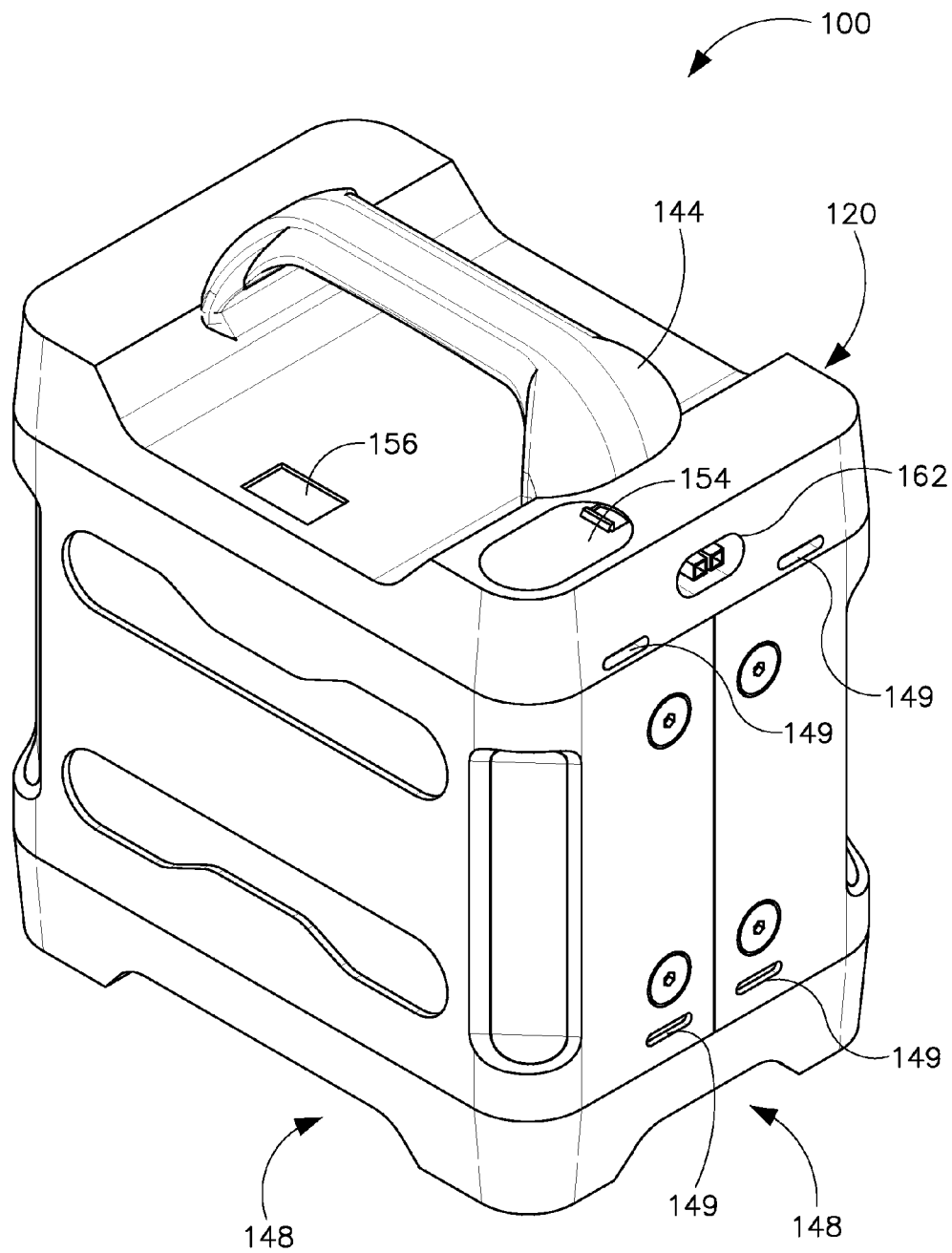
FIG. 27 is a schematic image of a perspective view of an individual battery module for the battery pack power system of FIG. 21 according to an exemplary embodiment.
Figure 28:
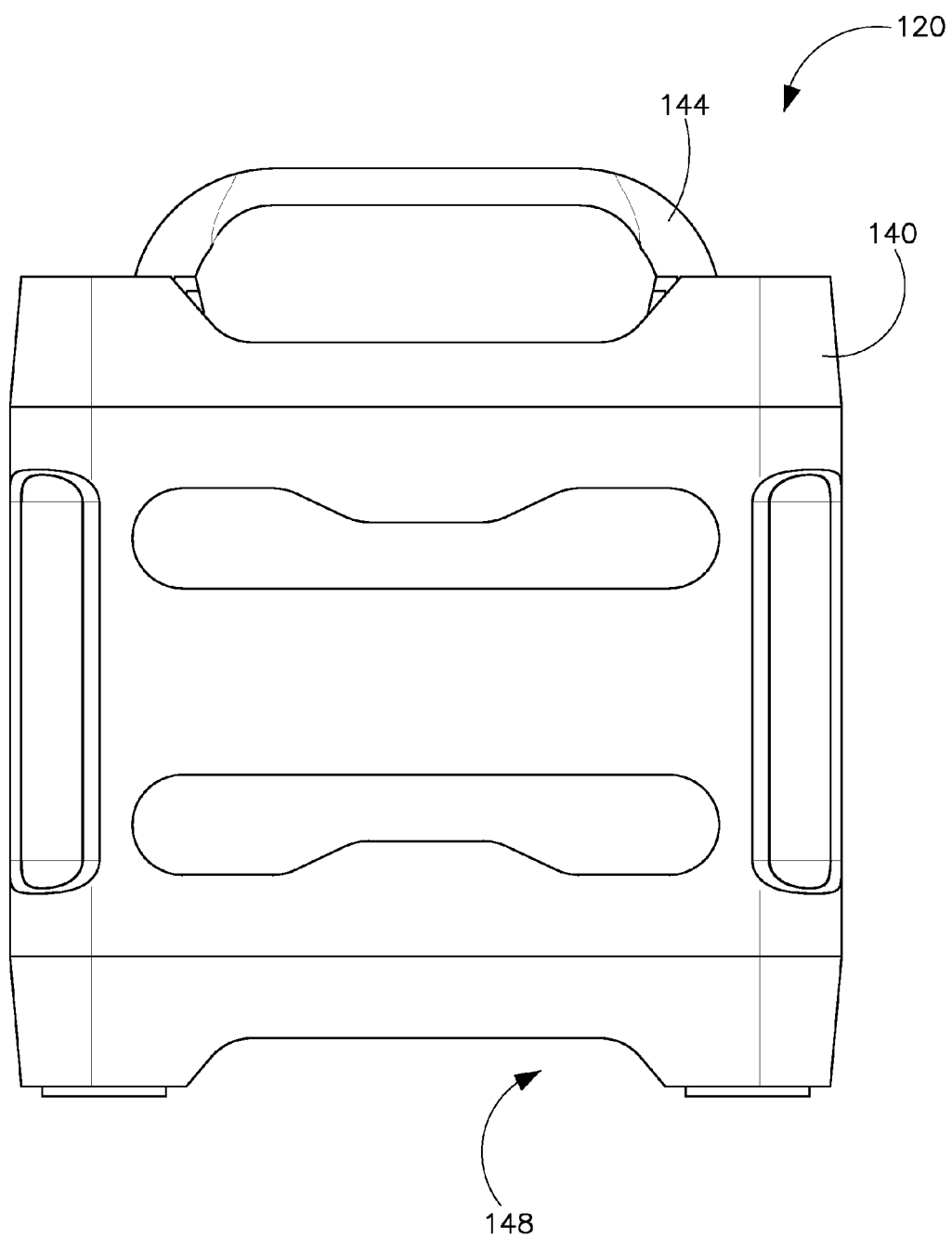
FIG. 28 is a schematic image of a front elevation view of an individual battery module for the battery pack power system of FIG. 21 according to an exemplary embodiment.
Figure 29:
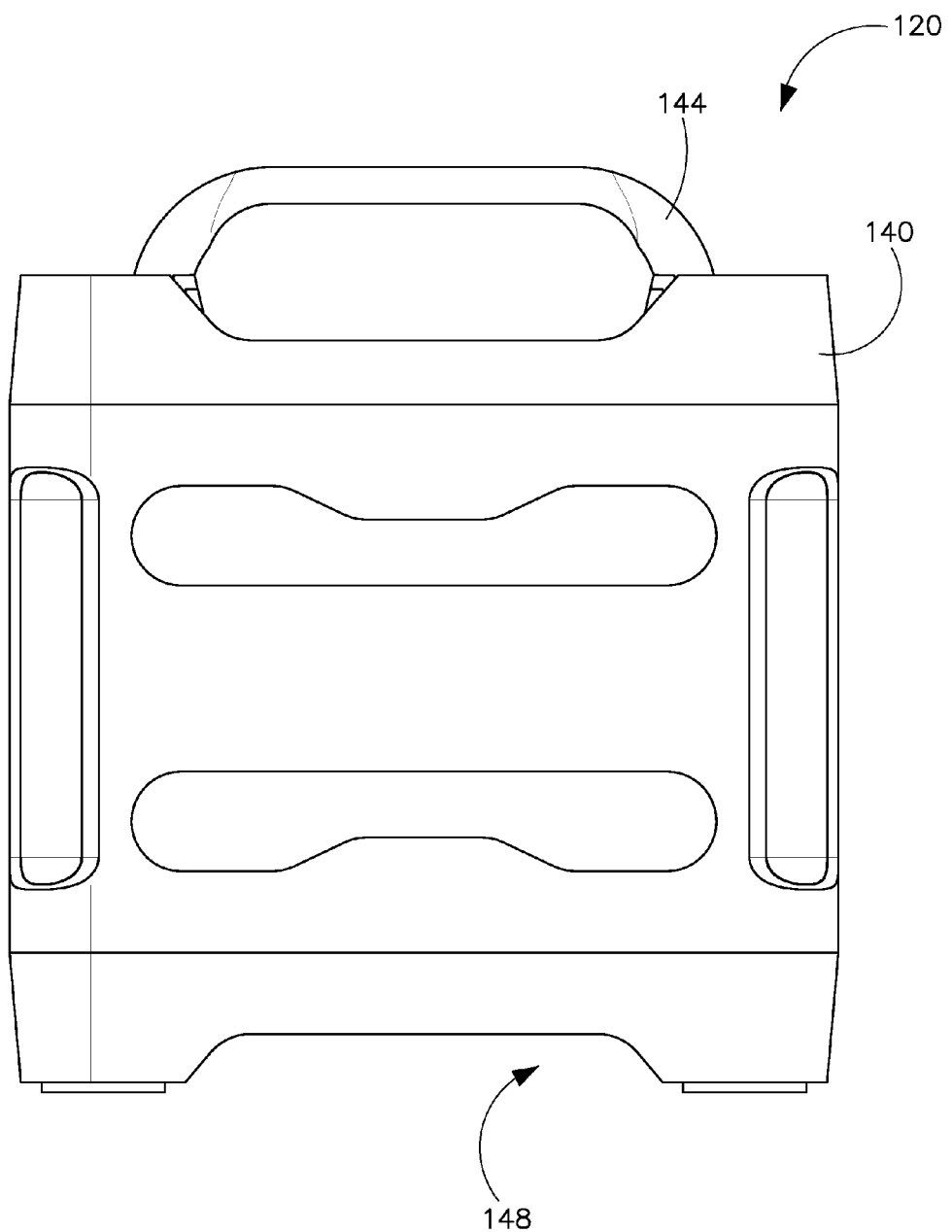
FIG. 29 is a schematic image of a rear elevation view of an individual battery module for the battery pack power system of FIG. 21 according to another exemplary embodiment.
Figure 30:
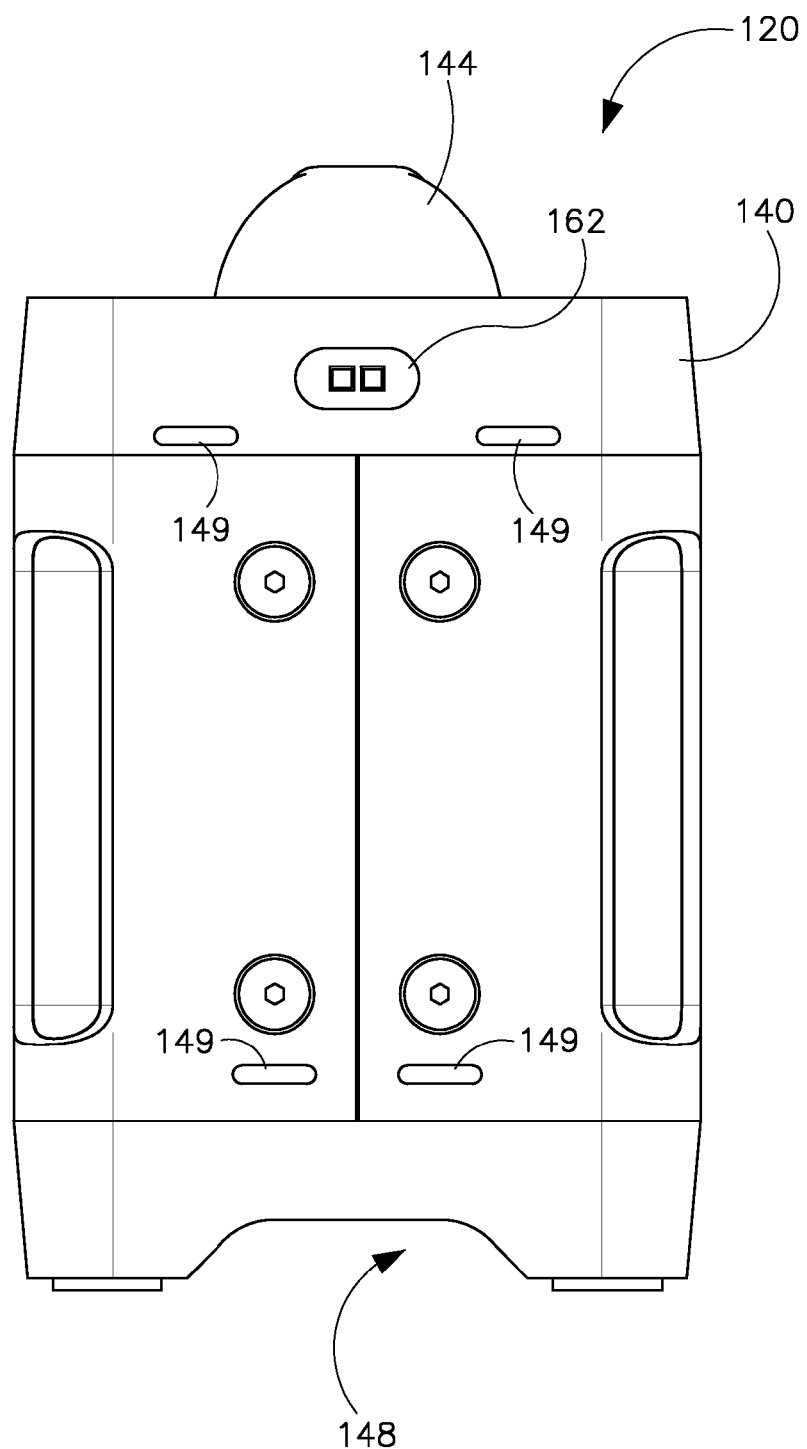
FIG. 30 is a schematic image of a right side elevation view of an individual battery module for the battery pack power system of FIG. 21 according to an exemplary embodiment.
Figure 31:
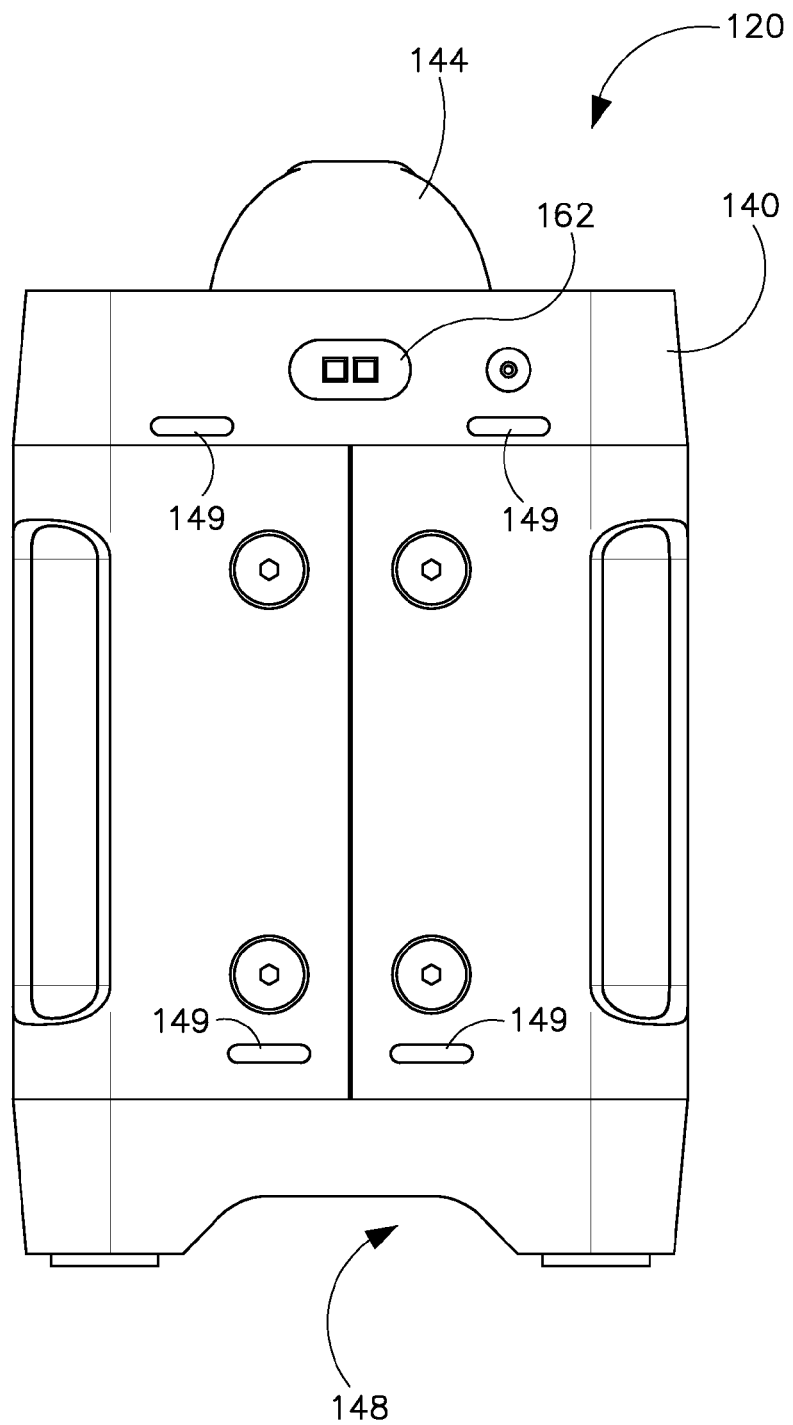
FIG. 31 is a schematic image of a left side elevation view of an individual battery module for the battery pack power system of FIG. 21 according to an exemplary embodiment.
Figure 32:
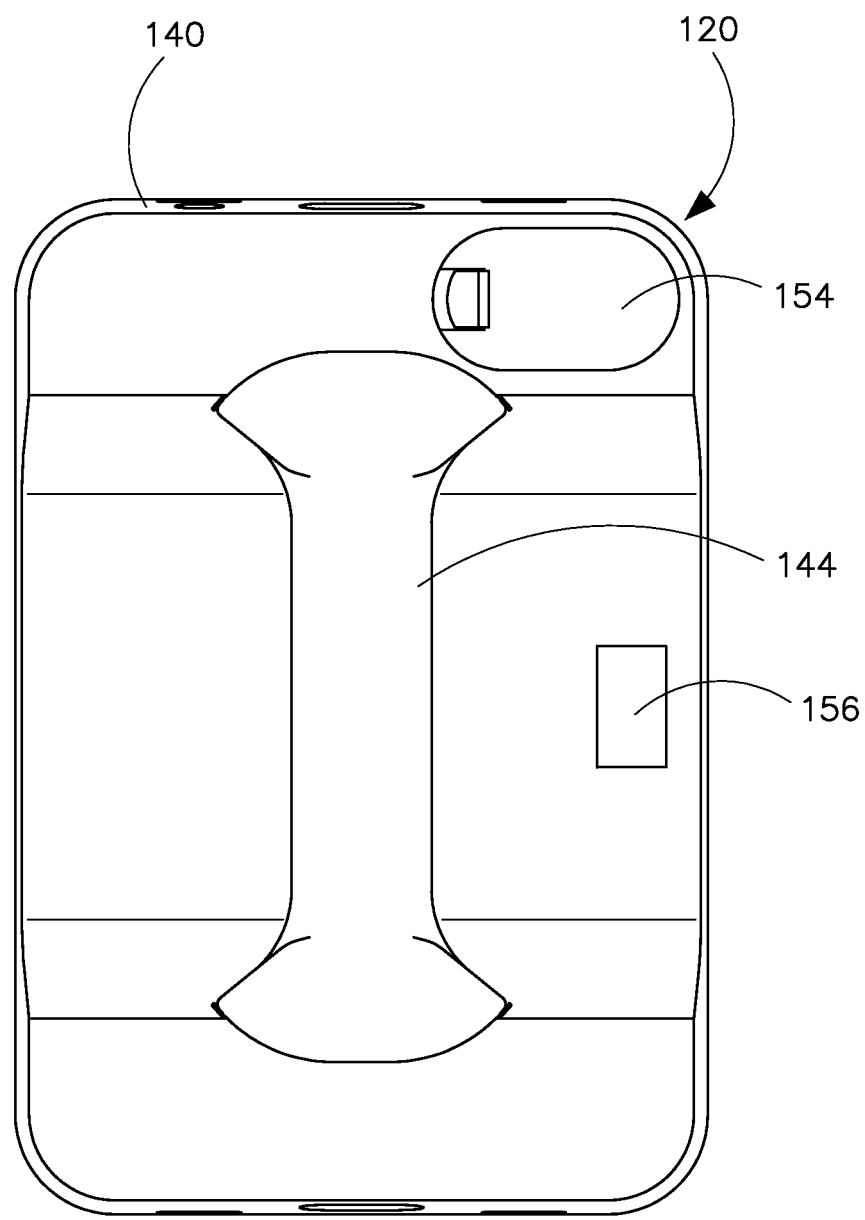
FIG. 32 is a schematic image of a top view of an individual battery module for the battery pack power system of FIG. 21 according to an exemplary embodiment.

Referring further to FIGS. 27 and 32, the individual battery modules also include a readily accessible fuse box 154 with a spring-biased door (e.g. cover, flap, etc.) to facilitate troubleshooting of the battery module 120 and permit fuses to be checked and replaced quickly and conveniently. FIGS. 27 and 32 also illustrate that the individual battery modules 120 include a charge indicator 156 that identifies the real-time charge state of the module. The battery modules 120 of the battery pack power system are rechargeable from a variety of sources including an electric grid connection (where available), or off-grid sources such as a vehicle 12 VDC connection (where available), and renewable sources such as a portable solar photovoltaic panel, a portable wind power generator, and/or a portable hydropower generator (e.g. when other sources are unavailable).

Figure 22:
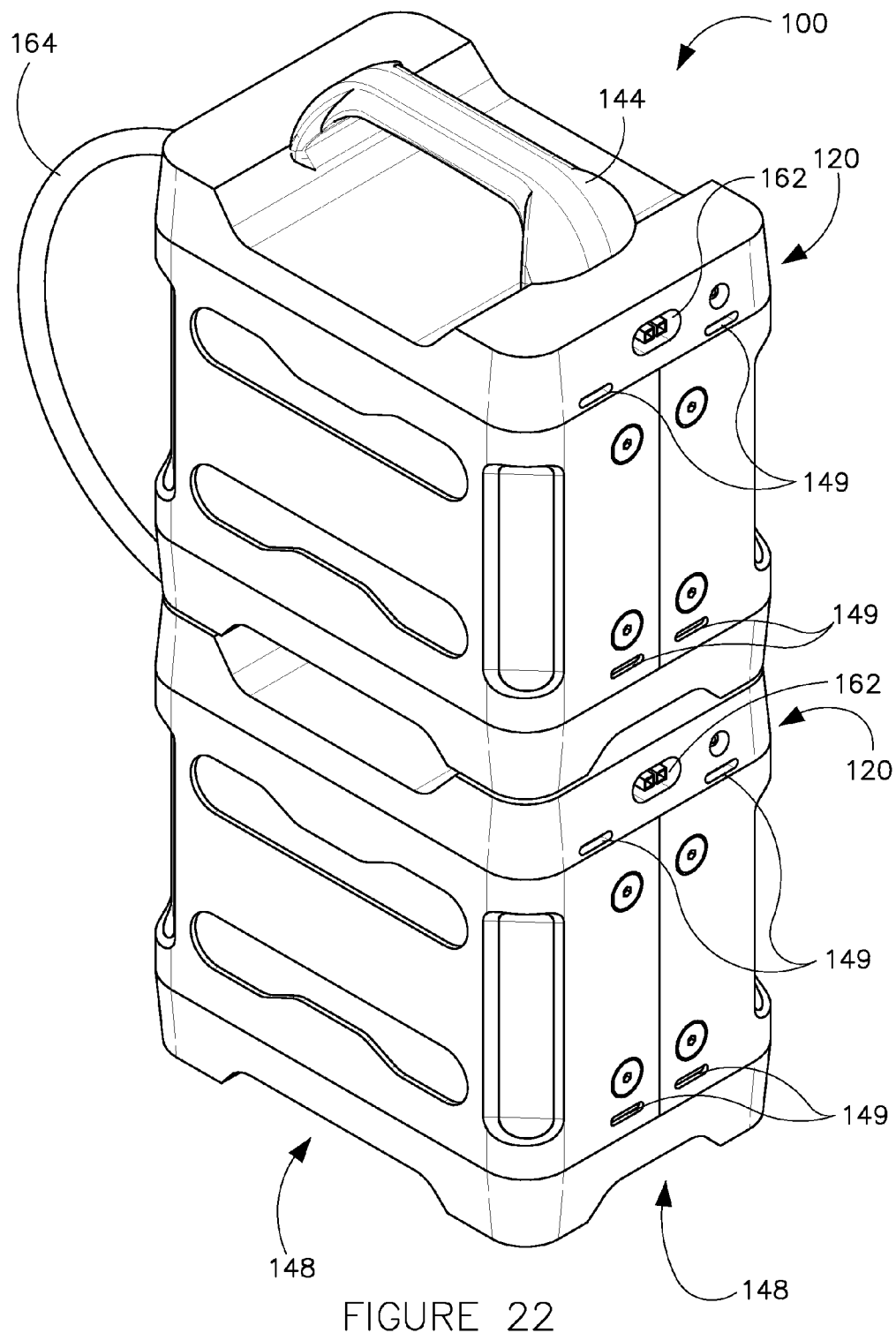
FIG. 22 is a schematic image of a perspective view of the battery pack power system of FIG. 21 with a flexible connector interconnecting individual battery modules according to an exemplary embodiment.
Figure 23:
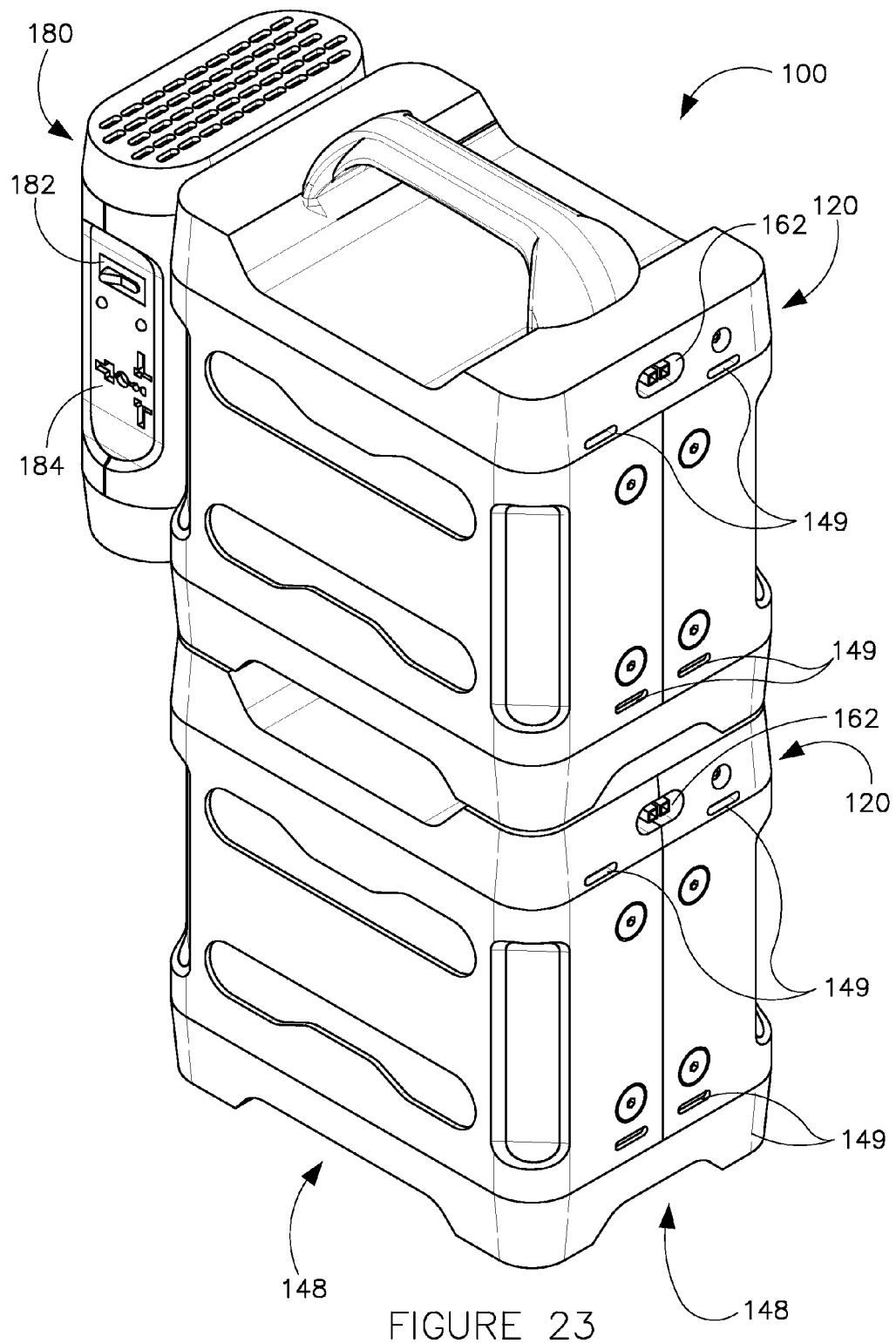
FIG. 23 is a schematic image of a perspective view of the battery pack power system of FIG. 21 with an inverter coupled to one of the individual battery modules according to an exemplary embodiment.
Figure 24:
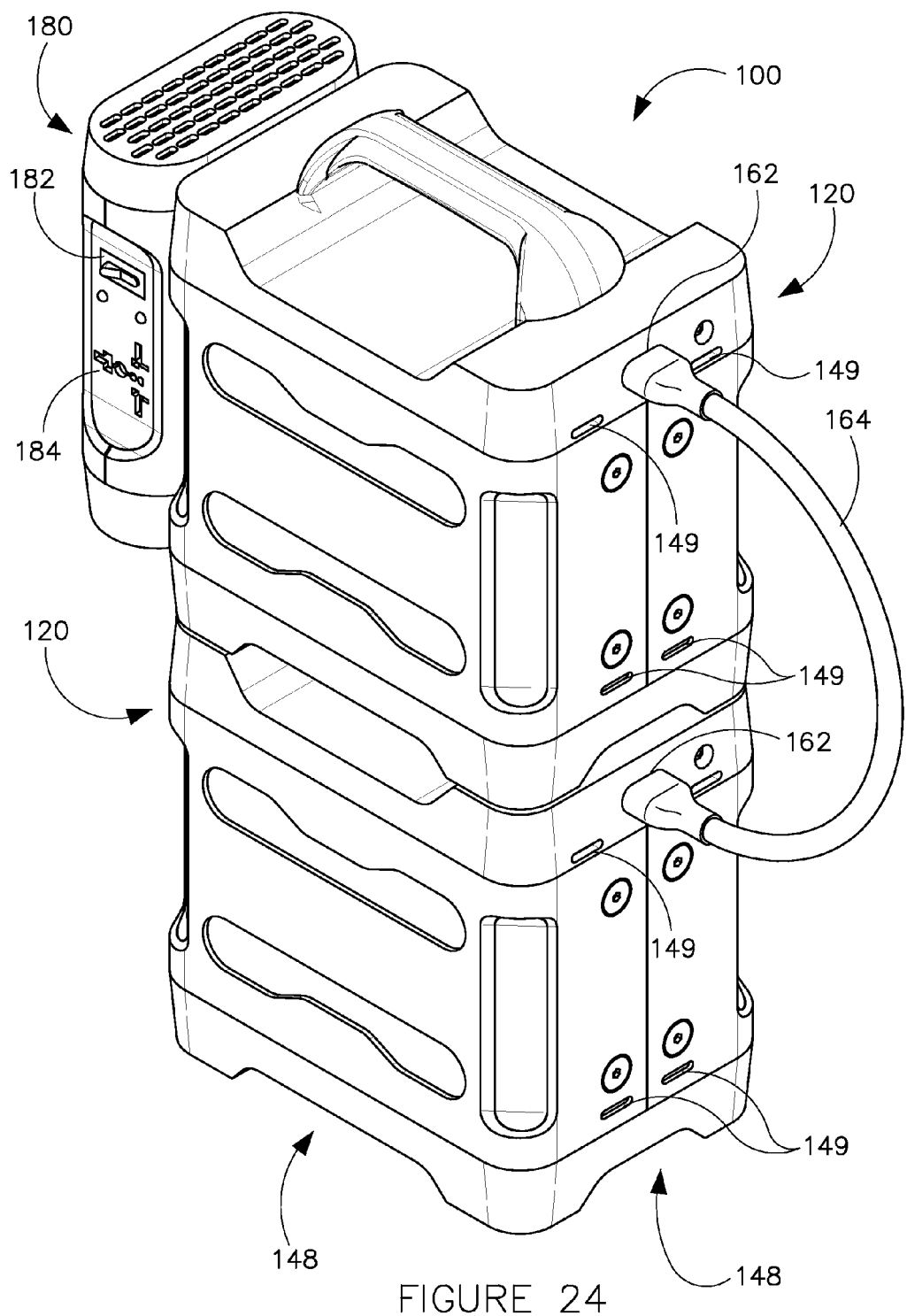
FIG. 24 is a schematic image of a perspective view of the battery pack power system of FIG. 21 with an inverter coupled to one of the individual battery modules and a flexible connector interconnecting the individual battery modules according to an exemplary embodiment.
Figure 25:
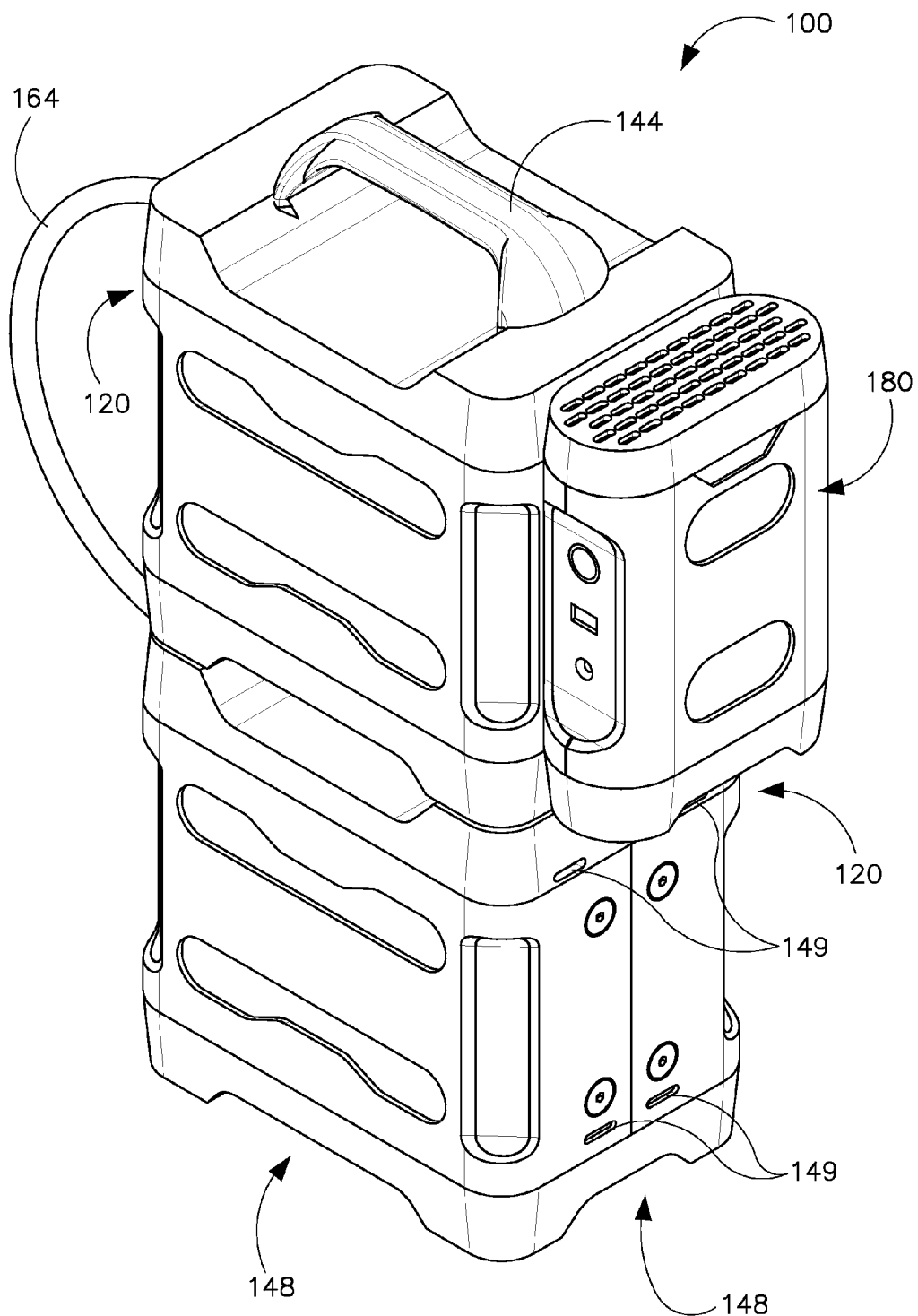
FIG. 25 is a schematic image of another perspective view of the battery pack power system of FIG. 21 with an inverter coupled to one of the individual battery modules and a flexible connector interconnecting the individual battery modules according to an exemplary embodiment.
Figure 26:
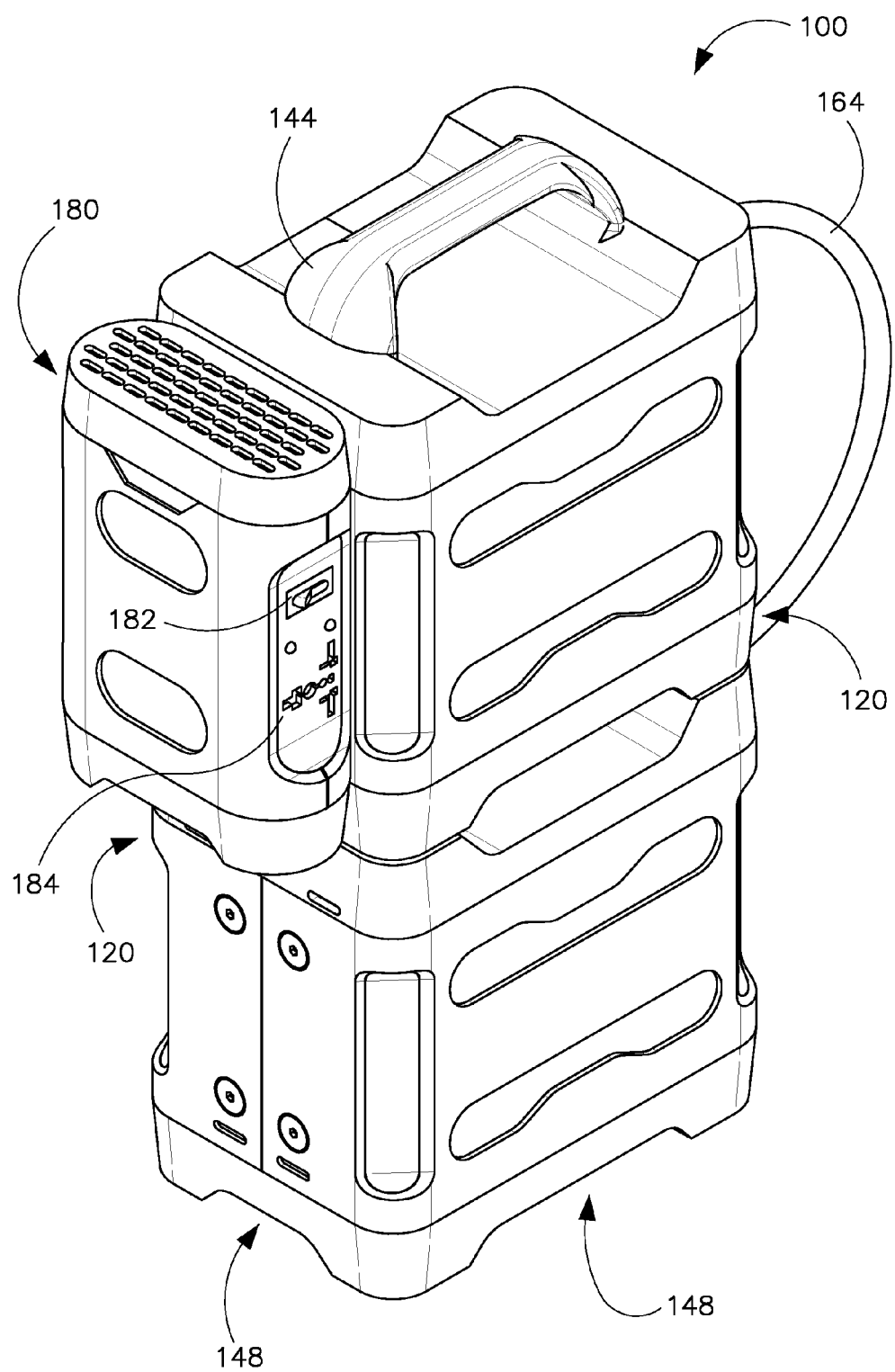
FIG. 26 is a schematic image of another perspective view of the battery pack power system of FIG. 21 with an inverter coupled to one of the individual battery modules and a flexible connector interconnecting the individual battery modules according to an exemplary embodiment.

Referring further to FIGS. 22, 24, 25, the battery pack power system 100 is shown to include a flexible connection device 164 (e.g. cable, etc.) that facilitates rapid and convenient electrical interconnection (e.g. "chaining") of the battery modules 120 to one another. According to the illustrated embodiment, the corresponding sockets on the modules 120 have recessed electrical contacts that receive the mating barrel-type connector plugs on the flexible connection device, so that all live electrical contact surfaces are recessed to reduce the likelihood of inadvertent or unintentional contact that may cause shock or injury, or cause short circuits leading to damage of the components. The configuration of the plugs on the flexible connection device permits only one-way, correct-orientation connection of modules to one another.

The battery modules 120 of the system may be used directly to provide DC power to a wide variety of loads, and include suitable output connectors, such as (but not limited to) USB connectors, 12V barrel connectors, 12V cigarette lighter connectors, etc.

The battery modules 120 of the system may also be used with an inverter module 180 to provide AC power (e.g. 110 VAC, 220 VAC, etc.) to a wide variety of electrical load devices. The inverter module 180 attaches directly to a side wall of the battery module 120 and is retained in place by a snug-fit electrical connection 162 with the battery module 120, and connectors (e.g. projections, tabs, etc.) that engage suitable recesses or slots on the wall of the module. The inverter module 180 includes a selector switch for operation at either 110 VAC or 220 VAC, and includes an indicator light identifying the output voltage level, and includes an on/off switch 182 to minimize unintentional drain on the battery module(s). The inverter module includes a number of output connectors, including a 'multi-standard' socket 184 configured to receive any of a wide variety of AC electric plug configurations, and includes sockets configured to receive other DC plug configurations including USB plugs, 12V barrel connectors, 12V cigarette lighter connectors, etc.

Referring now to FIGS. 34A through 36H, a battery module 3400 and an accessory module 3500 that are configured to be coupled to one another are shown and described according to exemplary embodiments. The accessory module 3500 may be any of a wide variety of accessory modules such as, by way of example, an inverter, a lighting device with a source of illumination, such as LEDs, etc., a charging device, a communication device (e.g. wireless, etc.), an electrically-powered tool or medical device, or any of a variety of other portable electrical devices that are all adapted to be physically and electrically engagable with the battery module 3400 to form a single integrated, but reconfigurable and interchangeable unit. According to the illustrated embodiment, accessory module 3500 is shown by way of example to be an inverter device, but any of the other variety of accessory modules are similarly available as accessory modules and are included in the scope of this disclosure.

The battery module 3400 and inverter module 3500 may be coupled to one another to form a portable, standalone, interchangeable, single integrated and substantially rigid power source and powered accessory, such as the battery module 3400 and inverter accessory module 3500 that combine to form an integrated power supply 3600 capable of providing electric power to other electrical devices (e.g. consumer electronics, etc.). Coupling the battery module 3400 and the inverter module 3500 is intended to provide a more solid structure during operation and/or transport of the modules. In some embodiments, the power supply 3600 may be configured such that various adapters and/or accessories that provide power to or receive power from the power supply 3600 may also be rigidly coupled to the battery module 3400 and/or the inverter accessory module 3500. In various embodiments, the battery module 3400 and inverter accessory module 3500 may function similar to the battery modules and inverter modules described above and/or may include various features described above with reference to the other figures.

Referring specifically to FIGS. 34A through 34H, various illustrative views of the battery module 3400 are shown according to an exemplary embodiment. The battery module 3400 may include an on/off switch 3405 configured to enable and/or disable the flow of power in and/or out of the battery module 3400. The battery module 3400 may include a USB port 3410 and/or other types of input and/or output interfaces for receiving power from and/or providing power to various external devices. The battery module 3400 may include a charging port 3415 configured to enable the energy storage device of the battery module 3400 to be charged by an external source (e.g., transformer attached to a wall socket, solar charger, etc.). The battery module 3400 may include a battery meter 3420 configured to provide an indication of the current charge level of the battery. The battery module 3400 may include a first output port 3425 (e.g., an approximately 12V output port) and/or a second output port 3430 (e.g., a laptop output port to which a laptop charging adapter may be connected, an approximately 20V output port, etc.) configured to provide power to external devices. The battery module 3400 may also include structure associated with each of the ports that are intended to connect (e.g. mate, etc.) with only with certain other devices for which they are intended. Such structure may include raised shapes (posts, cylinders, squares, plugs, etc.) configured to fit within corresponding sockets or other structure associated with the connecting device or its connecting interface (or vice versa). In this manner, the battery module 3400 may provide features intended to assist a user with connecting only the proper device with the proper batter module port (e.g. for voltage level, input/output, etc.).

The battery module 3400 is also configured to be substantially rigidly coupled to an associated accessory module, shown for example as the inverter module 3500. The battery module 3400 may include a mounting port 3440 (e.g., a threaded recess) that may be used to mount the inverter module 3500 on the battery module 3400. For example, a threaded screw may be extended through the inverter module 3500 and threaded into the mounting port 3440. In various exemplary embodiments, various other types of rigid connection between the battery module 3400 and the inverter module 3500 may be utilized, such as clips, tabs, slide-locks, snap-fit interference connections, etc. In some embodiments, the battery module 3400 may include a power output port 3435 configured to provide power from the battery to the accessory module, such as the inverter module 3500 when the inverter module 3500 is placed into a coupled configuration with the battery module 3400. A side view of the battery module 3400 shown in FIG. 34F illustrates on embodiment of the mounting port 3440 and power output port 3435.

Referring now to FIGS. 35A through 35H, various illustrative views of an accessory module, shown by way of representative example as the inverter module 3500, are shown according to an exemplary embodiment. A side of the accessory module (shown as inverter module 3500) is designed to have substantially the same contour as a corresponding side of the battery module 3400 to allow for secure, rigid mating (the contour is shown by way of example as a substantially arcuate contour but the contour may have any shape or profile including for example, discontinuities or other mating features intended to facilitate interconnection of the battery module and accessory module). The inverter module 3500 includes an output socket 3510 configured to provide alternating current output to connected devices (e.g., 110 VAC, 220 VAC, etc.). The voltage of the power output provided at output socket 3510 may be controlled using a voltage switch 3505, and an indicator light 3508 may provide an indication of the selected voltage (e.g., 110 VAC or 220 VAC) (see, e.g., FIG. 35E). The inverter module 3500 includes a fastener 3520 (e.g., a screw) configured to enable a user to couple the inverter module 3500 to the battery module 3400. The inverter module 3500 may include a chaining port 3515 through which power (e.g., DC power) can be passed through to other devices connected to the inverter module 3500 (e.g., "side car" devices mounted to the inverter module 3500). A rear side of the inverter module 3500 may include a power coupling connector 3525 configured to be coupled to the power output port 3435 of the battery module 3400 to provide power from the battery module 3400 to the inverter module 3500 (see, e.g., FIGS. 35B, 35C, 35D, and 35H). The inverter module 3500 may include a venting system such as a vent hole 3530 to dissipate heat out of the housing of the inverter module 3500 (see, e.g., FIG. 35H).

Referring now to FIGS. 36A through 36H, various illustrative views of the integrated power source and powered accessory, shown as power supply 3600 including the battery module 3400 and the inverter module 3500, are shown according to an exemplary embodiment. In the illustrated exemplary embodiment, the accessory module, shown as inverter module 3500, is designed to have a similar shape to the battery module 3400 such that the integrated power source and accessory (e.g. power supply 3600) has substantially the same shape as the battery module 3400 but is elongated. Power supply 3600 can be used, transported, stored, etc. as a single integral unit, and the battery module 3400 and the inverter module 3500 may have a substantially fixed position with respect to one another when in the coupled configuration. The battery module 3400 and inverter module 3500 can be decoupled from one another by releasing or disengaging the fastener 3520 from the power output port 3435 (or other suitable connector).

In some exemplary embodiments, various adapter and/or accessory devices may be attached to the battery module 3400 and/or the inverter module 3500 to form a single integral, rigid structure. For example, a flashlight accessory may be attached to the battery module 3400 (e.g., if the inverter module 3500 is not attached) and/or the inverter module 3500 (e.g., if the inverter module 3500 is attached) and powered using the battery module 3400. In some embodiments (e.g., if the inverter module 3500 is not attached), the adapter/accessory may be mechanically coupled to the battery module 3400 using a fastener inserted into the mounting port 3440 of the battery module 3400, and the adapter/accessory may be electrically coupled to the battery module 3400 using an electrical contact coupled with the power output port 3435 of the battery module 3400. In some embodiments (e.g., if the inverter module 3500 is attached to the battery module 3400), the adapter/accessory may be mechanically coupled to the inverter module 3500 using a fastener inserted into a mounting port of the inverter module 3500 or extended through the inverter module 3500 and inserted into the mounting port 3440 of the battery module 3400, and the adapter/accessory may be electrically coupled to the inverter module 3500 and the battery module 3400 using an electrical contact coupled with the socket 3510 and/or chaining port 3515 of the inverter module 3500. In such an embodiment, the accessory modules are intended to be "nestable" or "stackable" with one another to provide enhanced and reconfigurable functional combinations and usage variations for a user. In various exemplary embodiments, various different types of adapters and/or accessories may be coupled directly to the battery module 3400 and/or indirectly via the inverter module 3500, such as a 220 v inverter, lights, emergency indicators and/or alarms, lanterns, strobes, specialty military ports, 24V adapters, base station stands, tools, medical devices, a product with which the power supply 3600 is integrated, fans, coolers, heaters, custom adapters and/or accessories for special applications, and/or any other types of adapters and/or accessories. Although the battery module is shown by way of example to receive an accessory module only on one side of the battery module, according to other embodiments, the battery module may be configured to receive an accessory on both sides of the battery module (or on a top or a bottom of the battery module), all such variations are intended to be within the scope of this disclosure.

It is also important to note that the construction and arrangement of the elements of the battery pack power system as shown schematically in the embodiments is illustrative only. Although only a few embodiments have been described in detail in this disclosure, those skilled in the art who review this disclosure will readily appreciate that many modifications are possible without materially departing from the novel teachings and advantages of the subject matter recited.

Accordingly, all such modifications are intended to be included within the scope of the present disclosure. Other substitutions, modifications, changes and omissions may be made in the design, operating conditions and arrangement of the preferred and other exemplary embodiments without departing from the spirit of the present disclosure.

Unless otherwise indicated, all numbers used in the specification and claims are to be understood as being modified in all instances by the term "about." Accordingly, unless indicated to the contrary, the numerical parameters set forth in the following specification and attached claims are approximations that may vary depending at least upon the specific analytical technique, the applicable embodiment, or other variation according to the particular configuration of the battery pack power system.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present invention as expressed in the appended claims.

What is claimed is:

1. A reconfigurable battery pack power system with interchangeable accessories, comprising:
   at least one modular, portable, rechargeable battery module having (a) a first side defining a first surface with a first contour, (b) a mounting port extending from the first surface of the first side into a body of the modular, portable, rechargeable battery module, and (c) a female power output port extending from the first surface of the first side into the body of the modular, portable, rechargeable battery module; and
   at least one accessory module configured to receive power from the modular, portable, rechargeable battery module, the accessory module having (a) a second side defining a second surface with a second contour configured to mate with the first contour on the modular, portable, rechargeable battery module, (b) a male power coupling connector extending away from the second surface of the second side and thereby positioned for insertion into the female power output port, and (c) a fastener extending away from the second surface of the second side and configured to engage the mounting port of the modular, portable, rechargeable battery module,
   wherein the accessory module is configured to be interchangeably mateable with the battery module upon lateral insertion between the first and second contours, with the male power coupling connector received by the female power output port and with the fastener engaged with the mounting port, so that the battery module and the accessory module form a single integrated and substantially rigid structure.

2. The reconfigurable battery pack power system with interchangeable accessories of claim 1 wherein the accessory module comprises at least one of a lighting device, an inverter, a tool, a medical device, and a communication device.

3. The reconfigurable battery pack power system with interchangeable accessories of claim 1 wherein the accessory module comprises an inverter module operable to receive power from the battery module and provide an electrical output of at least one of 110 VAC or 220 VAC.

4. The reconfigurable battery pack power system with interchangeable accessories of claim 3 wherein the accessory module is a first accessory module and wherein the first accessory module comprises the inverter module, and further comprising a second accessory module that is engageable with the inverter module and configured to receive power from the battery module via the inverter module.

5. The reconfigurable battery pack power system with interchangeable accessories of claim 1 wherein the accessory module comprises a plurality of accessory modules that are interchangeably nestable with one another and with at least one of the battery modules.

* * * * *